United States Patent
Uzawa et al.

(10) Patent No.: US 12,468,283 B2
(45) Date of Patent: Nov. 11, 2025

(54) ASSISTANCE SYSTEM FOR SETTING MACHINING CONDITION, ASSISTANCE PROGRAM USED IN THE ASSISTANCE SYSTEM, AND CONTROL METHOD THEREOF

(71) Applicant: MISUMI CORPORATION, Tokyo (JP)

(72) Inventors: Hiroyuki Uzawa, Tokyo (JP); Yasuhiro Matsumoto, Tokyo (JP)

(73) Assignee: MISUMI CORPORATION, Tokyo (JP)

(*) Notice: Subject to any disclaimer, the term of this patent is extended or adjusted under 35 U.S.C. 154(b) by 0 days.

(21) Appl. No.: 18/682,266

(22) PCT Filed: Aug. 2, 2022

(86) PCT No.: PCT/JP2022/029581
§ 371 (c)(1),
(2) Date: Feb. 8, 2024

(87) PCT Pub. No.: WO2023/021976
PCT Pub. Date: Feb. 23, 2023

(65) Prior Publication Data
US 2024/0264579 A1    Aug. 8, 2024

(30) Foreign Application Priority Data

Aug. 17, 2021   (JP) ................... 2021-132761

(51) Int. Cl.
*G06F 7/48* (2006.01)
*G05B 19/4093* (2006.01)
(Continued)

(52) U.S. Cl.
CPC ..... *G05B 19/4093* (2013.01); *G05B 19/4097* (2013.01); *G06F 30/10* (2020.01);
(Continued)

(58) Field of Classification Search
CPC ............ G05B 19/4093; G05B 19/4097; G05B 2219/32032; G05B 2219/49386;
(Continued)

(56) References Cited

U.S. PATENT DOCUMENTS

2002/0133264 A1* 9/2002 Maiteh ............... G05B 19/4097
700/86
2003/0204279 A1  10/2003 Yokohari et al.
(Continued)

FOREIGN PATENT DOCUMENTS

CN   105705289 A   6/2016
JP   H5134730 A    6/1993
(Continued)

OTHER PUBLICATIONS

He, Ziyang. A medial axis transformation based process planning method for rapid tooling. MS thesis. Iowa State University, 2017. (Year: 2017).*

(Continued)

*Primary Examiner* — Nithya J. Moll
(74) *Attorney, Agent, or Firm* — Leason Ellis LLP; Jordan Garner; Mitsuhiro Haraguchi

(57) ABSTRACT

An assistance system, that receives model data of an article from a client terminal and assists setting of a machining condition of the article, has: a specification unit configured to specify a first welding portion of the article from the model data according to a first condition among a plurality of priority conditions in manufacturing the article, and specify a second welding portion of the article from the model data according to a second condition different from the first condition among the plurality of priority conditions; a pattern generation unit configured to generate a first machining pattern image of the article in which the first welding portion is indicated and a second machining pattern (Continued)

image of the article in which the second welding portion is indicated; and a provision unit configured to provide a user with the first machining pattern image and the second machining pattern image.

11 Claims, 16 Drawing Sheets

(51) Int. Cl.
*G05B 19/4097* (2006.01)
*G06F 30/10* (2020.01)
*G06F 30/20* (2020.01)
*G06Q 30/0601* (2023.01)
*G06F 119/18* (2020.01)

(52) U.S. Cl.
CPC ......... *G06F 30/20* (2020.01); *G06Q 30/0611* (2013.01); *G06Q 30/0643* (2013.01); *G05B 2219/32032* (2013.01); *G05B 2219/49386* (2013.01); *G06F 2119/18* (2020.01)

(58) Field of Classification Search
CPC ...... G06F 2119/18; G06F 30/10; G06F 30/20; G06Q 30/0283; G06Q 30/0611; G06Q 30/0643; G06Q 50/04; G16Y 10/25; Y02P 90/30
See application file for complete search history.

(56) References Cited

U.S. PATENT DOCUMENTS

| | | | |
|---|---|---|---|
| 2004/0073469 A1 | 4/2004 | Emori et al. | |
| 2004/0148230 A1 | 7/2004 | Matsui et al. | |
| 2012/0029674 A1 | 2/2012 | Hida | |
| 2012/0265331 A1* | 10/2012 | Chu | G05B 19/4097 700/103 |
| 2015/0066191 A1* | 3/2015 | Yasukochi | G05B 19/4069 700/160 |
| 2016/0207142 A1 | 7/2016 | Kawamoto et al. | |

FOREIGN PATENT DOCUMENTS

| | | |
|---|---|---|
| JP | H7282142 A | 10/1995 |
| JP | H9231265 A | 9/1997 |
| JP | 2002203007 A | 7/2002 |
| JP | 2003316830 A | 11/2003 |
| JP | 2005157820 A | 6/2005 |
| JP | 2010184278 A | 8/2010 |
| WO | 2002054295 A1 | 7/2002 |

OTHER PUBLICATIONS

Mineo, Carmelo, et al. "Introducing a novel mesh following technique for approximation-free robotic tool path trajectories." Journal of Computational Design and Engineering 4.3 (2017): 192-202. (Year: 2017).*

* cited by examiner

ASSISTANCE SYSTEM FOR SETTING MACHINING CONDITION, ASSISTANCE PROGRAM USED IN THE ASSISTANCE SYSTEM, AND CONTROL METHOD THEREOF

CROSS-REFERENCE TO RELATED PATENT APPLICATIONS

This application is a U.S. National Phase Application under 35 U.S.C. § 371 of International Patent Application No. PCT/JP2022/029581 filed on Aug. 2, 2022 and claims the benefit of priority to Japanese Patent Application No. 2021-132761 filed on Aug. 17, 2021, the contents of all of which are incorporated herein by reference in their entireties. The International Application was published in Japanese on Feb. 23, 2023 as International Publication No. WO2023/021976 under PCT Article 21(2).

FIELD OF THE INVENTION

The present invention relates to an assistance system that generates an image in which a welding portion is indicated, an assistance program therefor, and a control method therefor.

BACKGROUND OF THE INVENTION

JP2002-203007A discloses a method for creating a quotation of sheet metal machining work. In the creating method, three-dimensional CAD data obtained by modeling a product by three-dimensional CAD is received from an orderer. Then, the product is divided into a plurality of components with reference to a stereoscopic diagram. In addition, a development diagram is created for each of the plurality of divided components. Furthermore, in a case of calculating the welding cost, the stereoscopic diagram divided into a plurality of components is read, a welding plane is indicated, and a welding length is calculated.

JP2005-157820A discloses a sheet metal equipment product sales system. In the system, design data such as a CAD drawing is received and a stereoscopic diagram is created. Then, the stereoscopic diagram is divided into a stereoscopic diagram of a component, and a development diagram is created with reference to the stereoscopic diagram of the component. Further, it is determined whether component machining of the product is possible, and when it is determined that all component machining is possible, a welding portion is extracted and a machining method is examined.

JP2010-184278A discloses a robot system including a welding robot. In the system, a welding line to be welded by the welding robot is automatically selected based on a workpiece figure of the three-dimensional CAD data displayed on a display screen.

CITATION LIST

Patent Literature

Patent Literature 1: JP2002-203007A
Patent Literature 2: JP2005-157820A
Patent Literature 3: JP2010-184278A

Technical Problem

An article desired to be manufactured by a user may be subjected to welding. In this case, the price of the article varies depending on the welding portion, and for example, when there are many welding portions, the price of the article increases. Therefore, a manufacturer creates a drawing indicating the welding portion of the article and provides the drawing to the user for confirmation. As a result, the user can confirm the welding portion and request machining of the article. However, in a case where the drawing does not match a condition desired by the user, the manufacturer needs to create a new drawing and provide the drawing to the user. Therefore, a process of creating a new drawing is added before the machining request.

SUMMARY OF THE INVENTION

Solution to Problem

An assistance system according to an aspect of the present invention is an assistance system that receives model data of an article from a client terminal and assists setting of a machining condition of the article, the assistance system comprising: a specification unit configured to specify a first welding portion of the article from the model data according to a first condition among a plurality of priority conditions in manufacturing the article, and specify a second welding portion of the article from the model data according to a second condition different from the first condition among the plurality of priority conditions; a pattern generation unit configured to generate a first machining pattern image of the article in which the first welding portion is indicated and a second machining pattern image of the article in which the second welding portion is indicated; and a provision unit configured to provide a user with the first machining pattern image and the second machining pattern image.

Further, an assistance program according to an aspect of the present invention is an assistance program of an assistance system that includes a computer, receives model data of an article from a client terminal, and assists setting of a machining condition of the article, the assistance program causing the computer to function as: a specification unit configured to specify a first welding portion of the article from the model data according to a first condition among a plurality of priority conditions in manufacturing the article, and specify a second welding portion of the article from the model data according to a second condition different from the first condition among the plurality of priority conditions; a pattern generation unit configured to generate a first machining pattern image of the article in which the first welding portion is indicated and a second machining pattern image of the article in which the second welding portion is indicated; and a provision unit configured to provide a user with the first machining pattern image and the second machining pattern image.

Further, a control method according to an aspect of the present invention is a control method of an assistance system that receives model data of an article from a client terminal and assists setting of a machining condition of the article, the control method comprising: specifying a first welding portion of the article from the model data according to a first condition among a plurality of priority conditions in manufacturing the article, and specifying a second welding portion of the article from the model data according to a second condition different from the first condition among the plurality of priority conditions; generating a first machining pattern image of the article in which the first welding portion is indicated and a second machining pattern image of the article in which the second welding portion is indicated; and providing a user with the first machining pattern image and the second machining pattern image.

This makes it possible to provide a user with a plurality of images indicating welding portions in accordance with a plurality of mutually different priority conditions.

BRIEF DESCRIPTION OF THE DRAWINGS

FIG. 3 is a schematic diagram illustrating an example of a quotation screen.

FIG. 15 is a schematic diagram illustrating a confirmation screen for a welding portion.

DETAILED DESCRIPTION OF THE INVENTION

Hereinafter, exemplary embodiments for carrying out the present invention will be described in detail with reference to the drawings. However, the dimensions, materials, shapes and relative positions of the components described in the following embodiments can be arbitrary set and can be changed according to the configuration of an apparatus to which the present invention is applied or to various conditions. Unless otherwise specified, the scope of the present invention is not limited to the embodiments specifically described below.

First Embodiment

Figure 1:
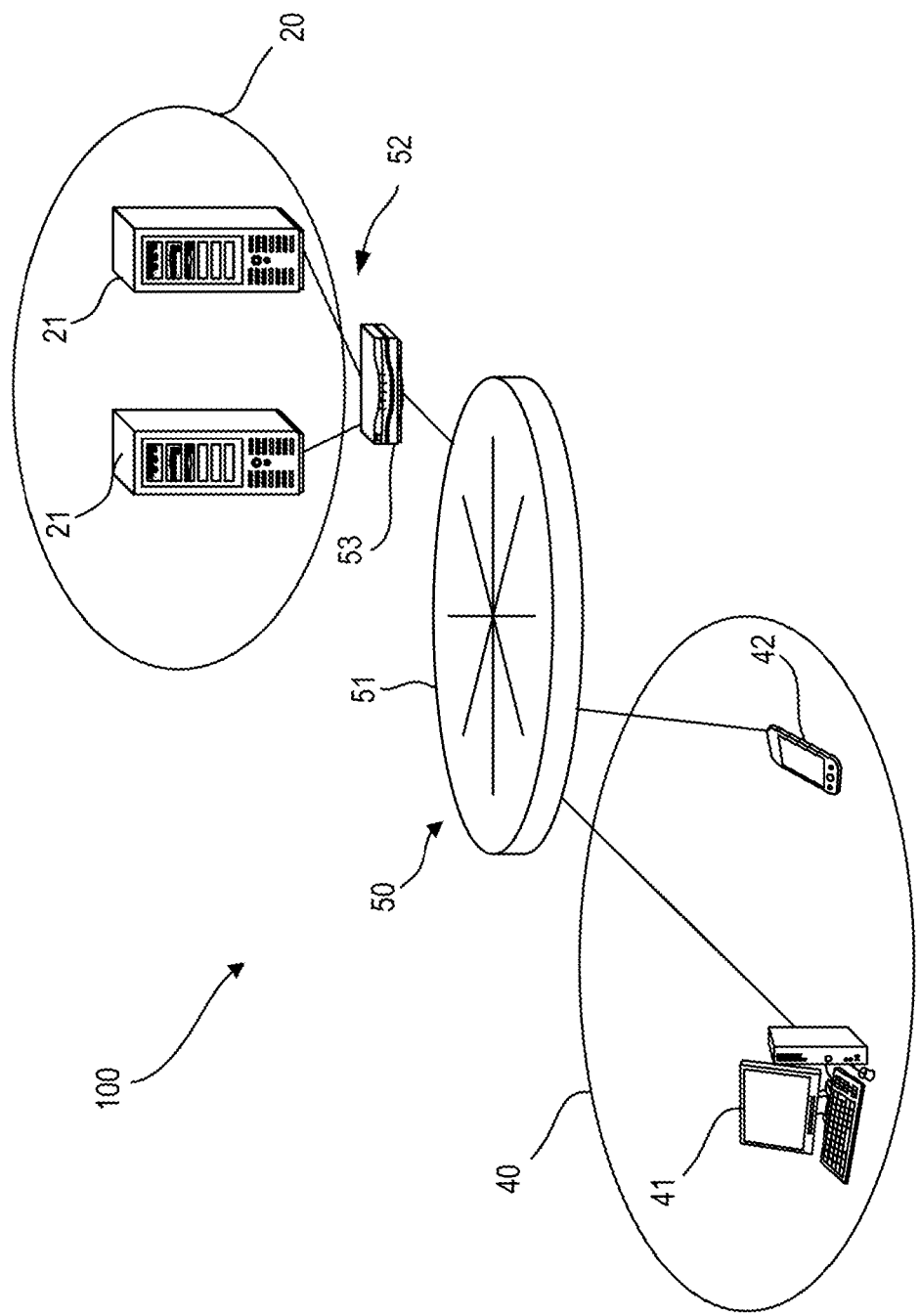
FIG. 1 is a schematic configuration diagram of an entire assistance system.

FIG. 1 illustrates an assistance system 100 that receives model data D1 (FIG. 2) of an article from a client terminal 40 and assists setting of a machining condition of the article. For example, the user transmits the model data D1 of the article from the client terminal 40. Then, a server 20 of the assistance system 100 receives the model data D1 from the client terminal 40 and stores the model data D1. Incidentally, the article itself may be a finished product having one integrated function, or may be one article incorporated into a finished product or an assembly configured from a plurality of components. Further, the article includes a unit in which a plurality of components are combined, a jig, a device, and equipment.

The model data D1 is three-dimensional computer aided design (CAD) data representing a shape of an article as an example, and may include information such as dimensions and positions of elements constituting the article. Specifically, the model data D1 is a shell model in which components constituting the article are integrated, a non-coupled model in which components constituting the article are separated, or an assembly model including a plurality of components. In addition, the element is, for example, portions constituting an article such as a hole, an axis, a step, a notch, a corner, a plane, a ridge line, etc., and includes a shape obtained by machining. In addition, the machining condition is a condition required for machining, and includes the condition such as a machining method, a finishing method, a welding portion, a welding margin, a bending portion, and an expansion margin. In the following description, an example of assisting the setting of the welding portion as the machining condition will be described.

The assistance system 100 is configured as a network system including the server 20 as an assistance server or a client server system. The server 20 functions as a server device, and is configured as one logical server device by combining, for example, server units 21 as a plurality of computers. However, the server 20 may be configured by a single server unit 21. Alternatively, the server 20 may be logically configured by using cloud computing. The server 20 provides the client terminal 40 or the user of the client terminal 40 with various services including an assistance service that assists setting of the machining condition and an article quotation service. The services include a distribution service for distributing a program or data to the client terminal 40 via a network 50 and a storage service for storing data received from the client terminal 40. The distribution service is, for example, a service that distributes data for update.

The client terminal 40 is a computer device capable of network connection. For example, the client terminal 40 includes a stationary or book type personal computer 41, a portable tablet terminal device 42, etc. The client terminal 40 further includes a mobile terminal device such as a portable phone (including a smartphone). The client terminal 40 can cause the user to enjoy various services provided by the server 20 by implementing various types of computer software. In addition, the client terminal 40 can be connected to the server 20 via a predetermined network 50. A case where the client terminal 40 is the personal computer 41 will be described below.

The network 50 is configured such that each client terminal 40 can be connected to the server 20. As an example, the network 50 is configured to realize network communication by using a TCP/IP protocol. Specifically, a local area network (LAN) 52 connects the server 20 and the Internet 51. The Internet 51 as a wide area network (WAN) is connected to the LAN 52 via a router 53. Furthermore, the network 50 may be any of a dedicated line, a telephone line, an in-enterprise network, a mobile communication network, other communication lines, and combinations thereof, and may be wired or wireless. The client terminal 40 is also configured to be connected to the Internet 51. Alternatively, the server units 21 of the server 20 may be connected to each other by the Internet 51 instead of or in addition to the LAN 52.

The server 20 guides the user to various procedures necessary for the user to set the machining condition of the article via the client terminal 40. That is, the server 20 functions as a web server that causes various web pages to be displayed on a display part of the client terminal 40 according to an access from the client terminal 40. Furthermore, the server 20 may execute a process such as arrangement of an ordered article, a delivery instruction, and billing of the purchase price in response to the order placed by the user.

[Control System]

Next, a schematic configuration of a control system of the assistance system 100 will be described with reference to FIG. 2. The server 20 includes a server control part 22 as a control unit and a server memory 23 as a non-transitory computer-readable storage medium. The server control part 22 is configured as a computer in which a processor that executes various arithmetic processes and operation control according to a predetermined program, an internal memory necessary for the operation of the processor, and other peripheral devices are combined. The processor is, for example, a central processing unit (CPU) or a micro-processing unit (MPU), and controls the entire device based on a control program stored in the server memory 23 and also controls various processes in an integrated manner. Furthermore, the server control part 22 executes various types of processes associated with the setting of the machining condition of the article based on an assistance program PG stored in the server memory 23.

The server memory 23 includes random access memory (RAM) that is a system work memory for the processor to operate, and a storage device such as a read only memory (ROM), a hard disc drive (HDD), and a solid state drive (SSD) that store a program and system software. However, the server memory 23 is not limited to the example of being provided as a part of the server 20, and may be provided as a database server that cooperates with the server 20. In the following description, the CPU executes processing operations such as various calculations, controls, and determinations according to the control program stored in the ROM or the HDD.

In addition, the server memory 23 stores the model data D1 of an article and condition data D2 including information indicating a plurality of priority conditions. The condition data D2 includes at least information indicating a first condition among the plurality of priority conditions and information indicating a second condition different from the first condition. As an example, the priority condition includes a condition prioritizing a manufacturing price of an article, a condition prioritizing good appearance of an article, a condition prioritizing strength of an article, a condition prioritizing liquid tightness of an article, and a condition prioritizing airtightness of an article. Further, the priority condition may be a condition that prioritizes lightness of a weight of an article. This is because the transportation cost may be increased when the weight of the article manufactured by welding is heavy. In addition, the priority condition may be a condition that gives priority to an article having an opening through which an operator's hand can enter. This is because, depending on a shape of an article, it is necessary for the operator to perform welding work by inserting a hand into an inner space.

For example, in the condition prioritizing the manufacturing price of the article, a machining condition in which the manufacturing price of the article is lower is prioritized. In addition, in the condition prioritizing the good appearance of the article, a machining condition having less difference in the appearance as compared with the initial three-dimensional image represented by the model data D1 is prioritized. The difference in the appearance is, for example, a difference between a corner not rounded and a corner rounded. In addition, in the condition prioritizing the strength of the article, a machining condition having high tensile strength, compressive strength, or shear strength of the article is prioritized. In addition, in the condition prioritizing the liquid tightness of the article, a machining condition in which a degree in which a liquid inside the article does not leak to an outside is higher or a degree in which a liquid does not flow into the article is higher is prioritized. In addition, in the condition prioritizing the airtightness of the article, a machining condition is prioritized in which a degree in which a gas inside the article does not leak to an outside is higher or a degree in which a gas does not flow into the article is higher.

For example, the condition data D2 is a table or a list in which priority conditions are defined. The table or list is created in advance by an administrator of the server 20. In addition, the user may be able to set a priority condition to be used for specifying a welding portion by selecting from a plurality of priority conditions. Alternatively, the condition data D2 may be automatically created by the server 20. As an example, the server 20 duplicates the condition data D2 applied to the model data D1 uploaded by the user in the past, and creates condition data D2 to be applied to the model data D1 newly uploaded by the user.

Alternatively, the condition data D2 may be created by the user. Further, the user may be able to change the condition data D2 automatically created or created by the administrator. For example, the user may change the priority condition indicated by the condition data D2 from a setting screen (not illustrated). Further, the plurality of priority conditions may be a condition of following the selection by the artificial intelligence or a condition of following the condition often used with reference to the past order history.

An operation part (not illustrated) is connected to the server control part 22 in a wired or wireless manner, and the operation part includes a keyboard or various switches for inputting predetermined commands and data. In addition, a display part (not illustrated) is connected to the server control part 22 in a wired or wireless manner, and the display part displays an input state, a setting state, a measurement result, and various types of information of the server device. Incidentally, the server control part 22 can also perform control according to a program stored in a portable recording medium such as a compact disc (CD), a digital versatile disc (DVD), a compact flash (CF) card, or a universal serial bus (USB) memory, or an external storage medium such as a cloud server on the Internet.

The assistance program PG stored in the server memory 23 causes the server control part 22 that is a computer to function as a data acquisition part 22A that is an example of a data acquisition unit, a specification part 22B that is an example of a specification unit, a quotation part 22D that is an example of a quotation unit, a generation part 22G that is an example of a pattern generation unit, and a provision part 22H that is an example of a provision unit. That is, the server control part 22 has a data acquisition part 22A, a specification part 22B, a quotation part 22D, a generation part 22G, and a provision part 22H as logical devices realized by a combination of computer hardware and software.

Incidentally, the server control part 22 has, in addition to the logical devices described above, for example, a logical device (not illustrated) that controls switching display of a web page according to an operation of the client terminal 40.

Furthermore, the server memory 23 stores various types of data (not illustrated) such as user information, a past quotation result, image data used to display a web page, and data including information such as a model number, a name or a feature of a product or an article.

[Data Acquisition Unit]

The data acquisition part 22A acquires the model data D1 of an article. As an example, the user uploads the model data D1 to the server 20. Then, the server control part 22 causes the server memory 23 to store the model data D1 received from the client terminal 40 of the user. Subsequently, the data acquisition part 22A acquires the model data D1 from the server memory 23. The article represented by the model data D1 includes at least two portions to be welded to each other. The portion to be welded may be a separate body or a part of an integrated member.

[Specification Unit]

The specification part 22B specifies a first welding portion of the article from the model data D1 according to a first condition among a plurality of priority conditions in manufacturing the article. The specification part 22B specifies a second welding portion of the article from the model data D1 according to a second condition different from the first condition among the plurality of priority conditions. Here, each of the first welding portion and the second welding portion is at least one portion, and may include a plurality of welding portions. Further, the specification part 22B may specify a further welding portion (for example, a third welding portion) according to a further condition (for example, a third condition) different from the first and second conditions. The welding portions specified by the specification part 22B may include the same welding portion. For example, the first welding portion and the second welding portion may include at least one same welding portion.

Incidentally, the first condition and the second condition may be conditions indicating different degrees based on the same criterion. For example, both the first condition and the second condition may be based on a low manufacturing price as a criterion, and based on the criterion, the first condition may be a condition that the manufacturing price is the lowest, and the second condition may be a condition that the manufacturing price is the second lowest. The same applies to the further condition different from the first and second conditions, and for example, a condition that the manufacturing price is the third lowest may be used.

As an example, the specification part 22B identifies a portion where welding can be performed in the article based on the model data D1. Then, the specification part 22B refers to condition data D2 to acquire first and second priority conditions used for specifying a welding portion. Subsequently, from among the identified weldable portions, the specification part 22B specifies the first welding portion according to the first condition and specifies the second welding portion according to the second condition. Alternatively, the specification part 22B may first acquire the first and second priority conditions used to specify the welding portion. In this case, the specification part 22B may execute the identification of the weldable portion and the specification of the first and second welding portions in parallel.

Specifically, the specification part 22B executes a shape recognition process of the article based on the model data D1. As an example, in the shape recognition process, the specification part 22B recognizes a shape of each element based on the model data D1. Furthermore, the specification part 22B recognizes each portion constituting the article. Subsequently, the specification part 22B creates pattern data having a topology structure. For example, the topology structure has information on a connection relationship between portions, an adjacency relationship between portions, and plane recognition of each portion surrounded by lines. Then, the specification part 22B identifies a portion where welding can be performed in the article. As an example, the specification part 22B recognizes a boundary line between adjacent portions as the weldable portion.

Then, the specification part 22B specifies the first and second welding portions from among the identified portions where welding can be performed. As an example, an example in which the article is a cubic box, a first condition is a condition prioritizing the good appearance of an article, and a second condition is a condition prioritizing the manufacturing price of an article will be described. In this case, when a plate-shaped member of which six planes are integrated is bent and then welded, corners are rounded. That is, the bending portion is rounded, and the beautiful appearance is impaired. On the other hand, when six plates of which six planes are separated are welded, the corners are not rounded, but the manufacturing price is higher. Therefore, the specification part 22B gives priority to the good appearance for the first welding portion, and specifies each edge of the six planes as the first welding portion. In addition, the specification part 22B gives priority to the low manufacturing price for the second welding portion, and specifies the outer edge of the plate-shaped member of which the six planes are integrated as the second welding portion.

Further, the specification part 22B may further specify a first bending portion of the article from the model data D1 according to the first condition. Alternatively, the specification part 22B may further specify a second bending portion of the article from the model data D1 according to the second condition. For example, in the example of the box described above, the specification part 22B prioritizes the low manufacturing price for the second welding portion, and specifies a connection portion between the planes of the plate-shaped member as the second bending portion. Incidentally, the specification part 22B may specify the first bending portion in addition to the second bending portion according to the priority condition.

Here, each of the first bending portion and the second bending portion is at least one portion, and may include a plurality of bending portions. Furthermore, the specification part 22B may specify a further bending portion (for example, a third bending portion) according to a condition different from the first and second conditions (for example, a third condition). The bending portions specified by the specification part 22B may include the same bending portion. For example, the first bending portion and the second bending portion may include at least one same bending portion.

[Quotation Unit]

The quotation part 22D creates quotation information including a first price of the article when welding the first welding portion and a second price of the article when welding the second welding portion. For example, the quotation part 22D creates the quotation information of the article when welding each welding portion based on welding setting corresponding to a plurality of machining pattern images (for example, the first machining pattern image and the second machining pattern image) generated by the generation part 22G to be described later. As a result, the quotation information of the article corresponding to each of the machining pattern images can be created based on the machining pattern image corresponding to the priority condition. Incidentally, the quotation part 22D may create the quotation information of the article corresponding to the machining pattern image selected by the user from among the plurality of machining pattern images.

Figure 3:
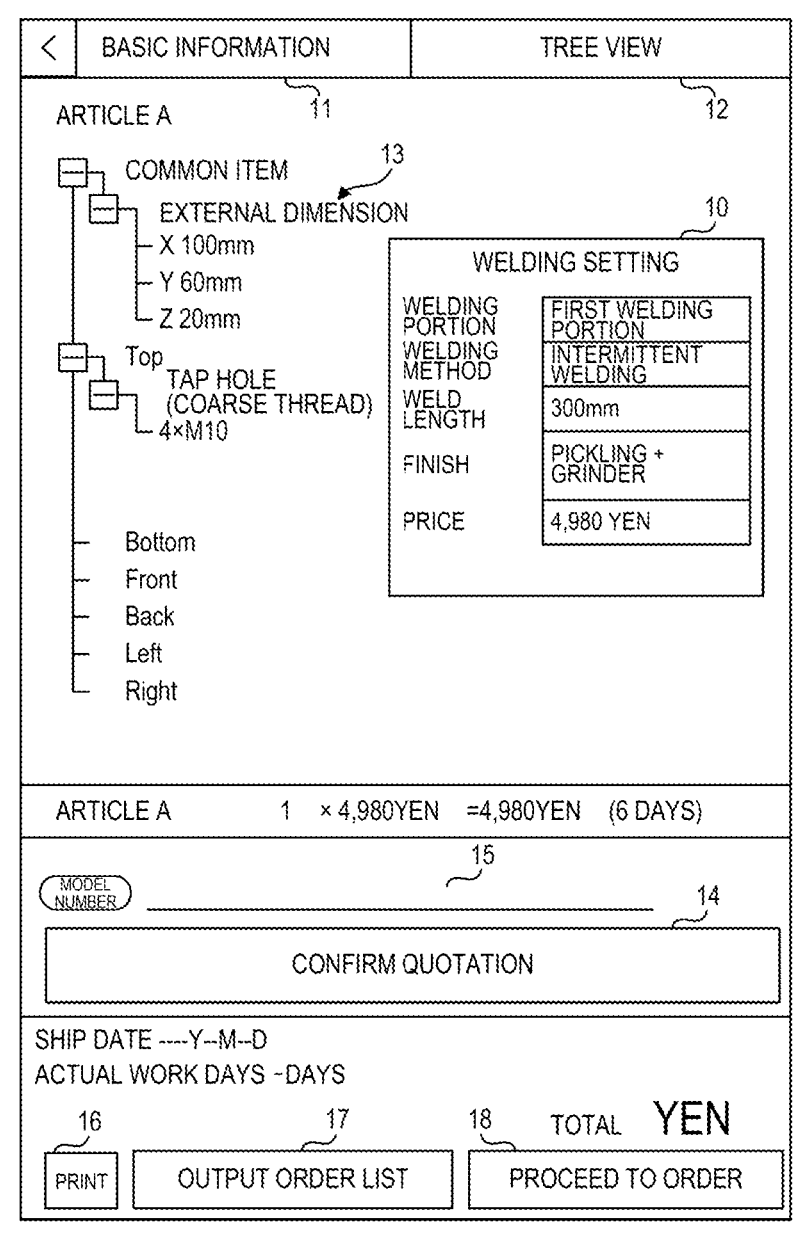

With reference to FIG. 3, the creation of the quotation information of the article in a case of welding the first welding portion will be described. FIG. 3 is an example of a quotation screen displayed on the display device 46 of the client terminal 40, and the quotation part 22D creates the quotation screen. A welding setting section 10 is displayed on the quotation screen. Incidentally, the welding setting section 10 is displayed together with the first and second machining pattern images to be described later, and thus is not limited to the aspect included in the quotation screen.

By displaying the welding setting section 10 on the display device 46 of the client terminal 40, the provision part 22H provides the user of the client terminal 40 with the quotation information of the article. Incidentally, the quotation part 22D creates quotation information including the second price of the article in a case of welding the second welding portion, similarly to the case of welding the first welding portion. As an example, the quotation information is at least one of the manufacturing price of the article and the number of days required for shipping the article. Alternatively, the quotation information may be a price of machining, a date on which the article is shipped, or a date on which the article is delivered to the user.

For example, the quotation part 22D quotes a manufacturing price obtained by adding a cost required for welding, a cost required for bending, a cost required for transportation, etc., to the prices of all the components. Alternatively, the quotation part 22D quotes the number of days required until shipment based on the number of days obtained by adding the number of days required for welding, the number of days required for bending, etc., to the number of days required for manufacturing all components. For example, when the number of welding portions increases (or becomes longer), the manufacturing price of the article increases.

The user can select each welding portion and designate a welding method, a welding length, and a finishing method. Incidentally, welding setting at an initial stage has contents corresponding to the machining pattern image generated by the generation part 22G. Then, the quotation part 22D creates the quotation information based on the model data D1 and the welding setting corresponding to the machining pattern image. That is, the quotation part 22D adds the cost required for the welding to the price of an article A, and adds the number of days required for the welding to the actual work days required until shipment. Incidentally, in a case where the bending is performed, similarly, the quotation part 22D adds the cost required for the bending to the price of the article A, and adds the number of days required for the bending to the actual work days required until shipment.

The quotation screen also includes a basic information tab 11 and a tree view tab 12. In a basic information view displayed by selecting the basic information tab 11, for example, information necessary for manufacturing, such as a material and a method of surface processing, and the purchase quantity are displayed. In the example of FIG. 3, a tree view 13 displayed by selecting the tree view tab 12 is illustrated. In the tree view 13, for example, an external dimension of the article is displayed.

In the example of FIG. 3, a dimension "100 mm" in the X-direction, a dimension "60 mm" in the Y-direction, and a dimension "20 mm" in the Z-direction are displayed as the information indicating an external dimension of the article A. Further, "4×M10" is displayed as information indicating that tap holes for a coarse thread corresponding to "M10" defined based on the JIS standard are machined in four portions on the upper plane (Top) of the article A. In addition, "4,980 yen" is displayed as the price of one article. Further, "6 days" is displayed as the number of days of actual work days required until shipment.

In addition, a quotation confirm button 14 is displayed at the lower part of the quotation screen. When the user selects the confirm button 14, the total monetary amount, the ship date, and the number of days of actual work days required until shipment are displayed below the confirm button 14. At this time, the amount of money obtained by multiplying the price of the article by the purchase quantity is displayed on the quotation screen as the total monetary amount. Further, the model number corresponding to the displayed article is displayed in a model number section 15. Further, a print button 16 is displayed below the confirm button 14. When the user selects the print button 16, a quotation result can be printed. Further, an output button 17 and an order button 18 are displayed side by side with the print button 16.

When the user selects the output button 17, electronic data of an order list can be output. In addition, when the user selects the order button 18, an order screen (not illustrated) for placing an order is displayed on the display device 46 of the client terminal 40. The user can place an order for the article specified by the model number on the order screen. When the user places an order for the article, the quotation part 22D transmits the specified model number and purchase quantity to the manufacturer of the article. Furthermore, the quotation part 22D may execute a process of transmitting a delivery instruction of the article to the manufacturer and a process of billing the purchase price to the user. Alternatively, when the user selects the order button 18 on the quotation screen, the quotation part 22D may transmit the specified model number and purchase quantity to the manufacturer of the article without displaying a further operation screen.

Further, the quotation part 22D executes an order placement process for an article corresponding to model data D1. In the order placement process, for example, the quotation part 22D specifies a model number of an article and creates an order screen as a web page for placing an order for the article corresponding to the specified model number. Then, the provision part 22H causes the order screen to be displayed on the display device 46 of the client terminal 40. Then, when the user places an order for the article, the quotation part 22D transmits the specified model number and purchase quantity to the manufacturer of the article. Incidentally, the quotation screen illustrated in FIG. 3 is a web page at a previous stage of the order screen.

[Pattern Generation Unit]

The generation part 22G generates the first machining pattern image of the article in which the first welding portion specified by the specification part 22B is indicated. In addition, the generation part 22G generates the second machining pattern image of the article in which the second welding portion specified by the specification part 22B is indicated. The first and second machining pattern images may be two-dimensional images such as development diagrams or six-sided diagrams, or may be three-dimensional images. Further, the generation part 22G may generate a further machining pattern image (for example, a third machining pattern image) in which a further welding portion (for example, a third welding portion) specified by the specification part 22B is indicated.

Further, the generation part 22G may generate the first machining pattern image in which the first welding portion and the first bending portion are indicated. In addition, the generation part 22G may generate the second machining pattern image in which the second welding portion and the second bending portion are indicated. In addition, the generation part 22G may generate a further machining pattern image (for example, a third machining pattern image) in which a further bending portion (for example, a third bending portion) specified by the specification part 22B is indicated.

Figure 4:
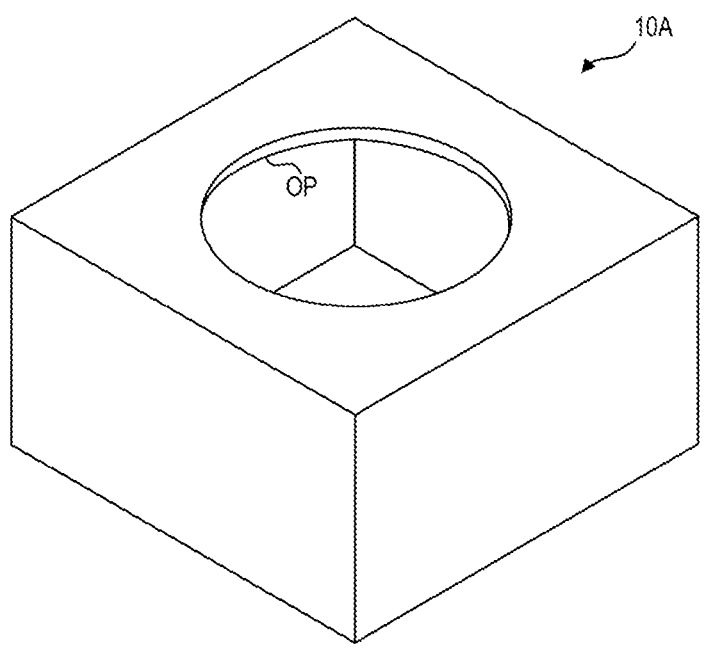
FIG. 4 is a schematic diagram illustrating an example of an initial three-dimensional image.
Figure 5:
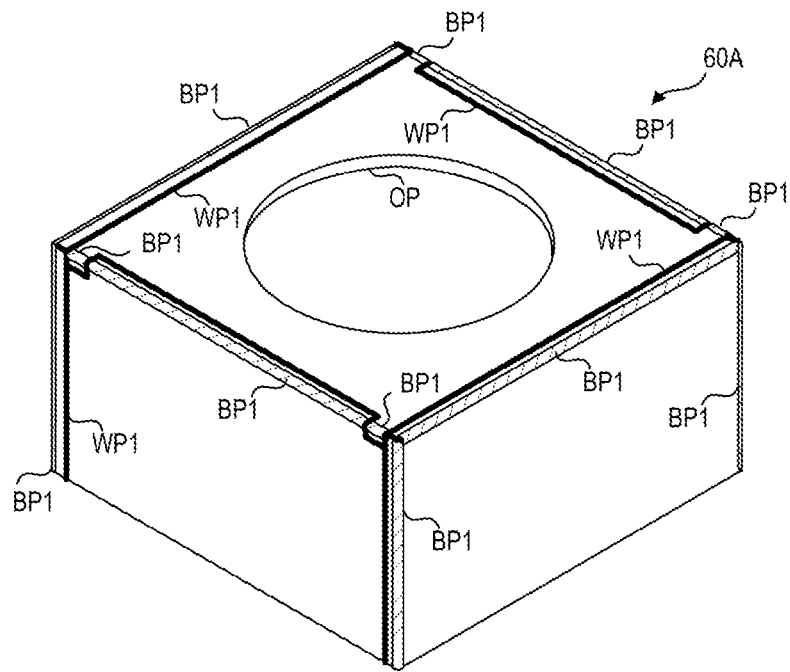
FIG. 5 is a schematic diagram illustrating a first three-dimensional pattern image.
Figure 6:
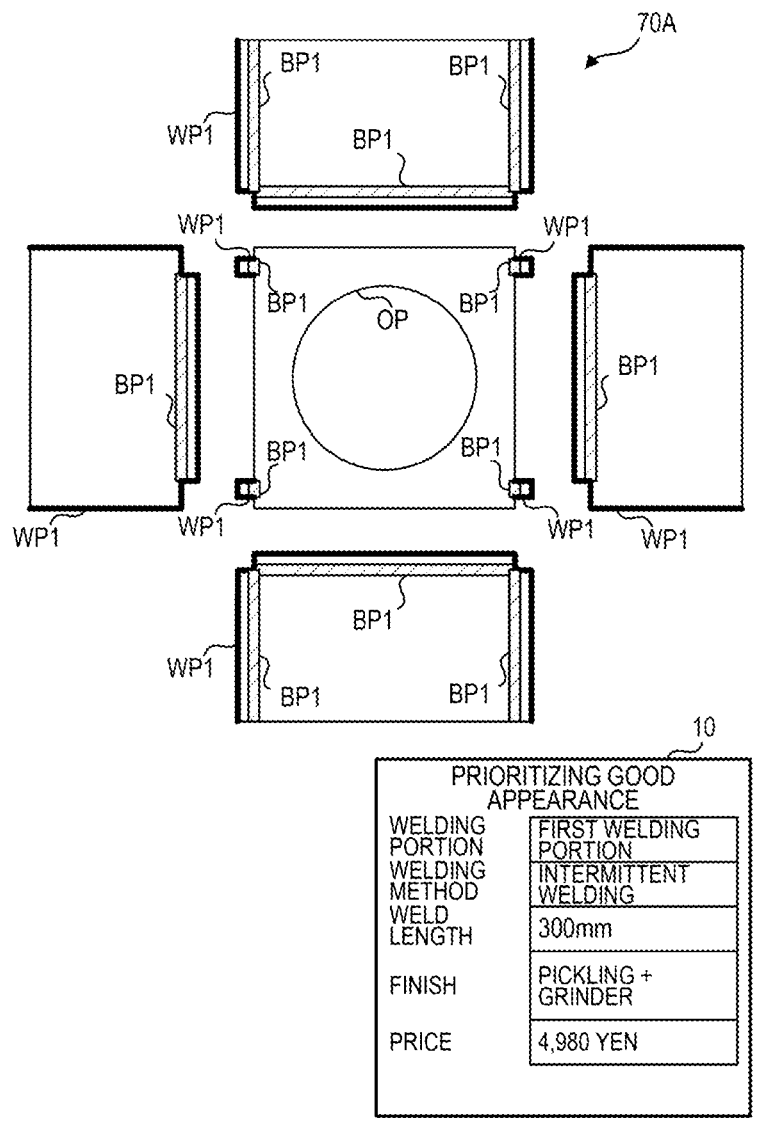
FIG. 6 is a schematic diagram illustrating a first two-dimensional pattern image.

The machining pattern image will be described with reference to FIGS. 4 to 8. FIG. 4 illustrates an initial three-dimensional image 10A created by the generation part 22G based on the model data D1 uploaded by the user. FIG. 5 illustrates a first three-dimensional pattern image 60A as a three-dimensional image which is an example of the first machining pattern image in which the first welding portions WP1 and the first bending portions BP1 are indicated. FIG. 6 illustrates a first two-dimensional pattern image 70A as a two-dimensional image that is another example of the first machining pattern image created by the generation part 22G.

Figure 7:
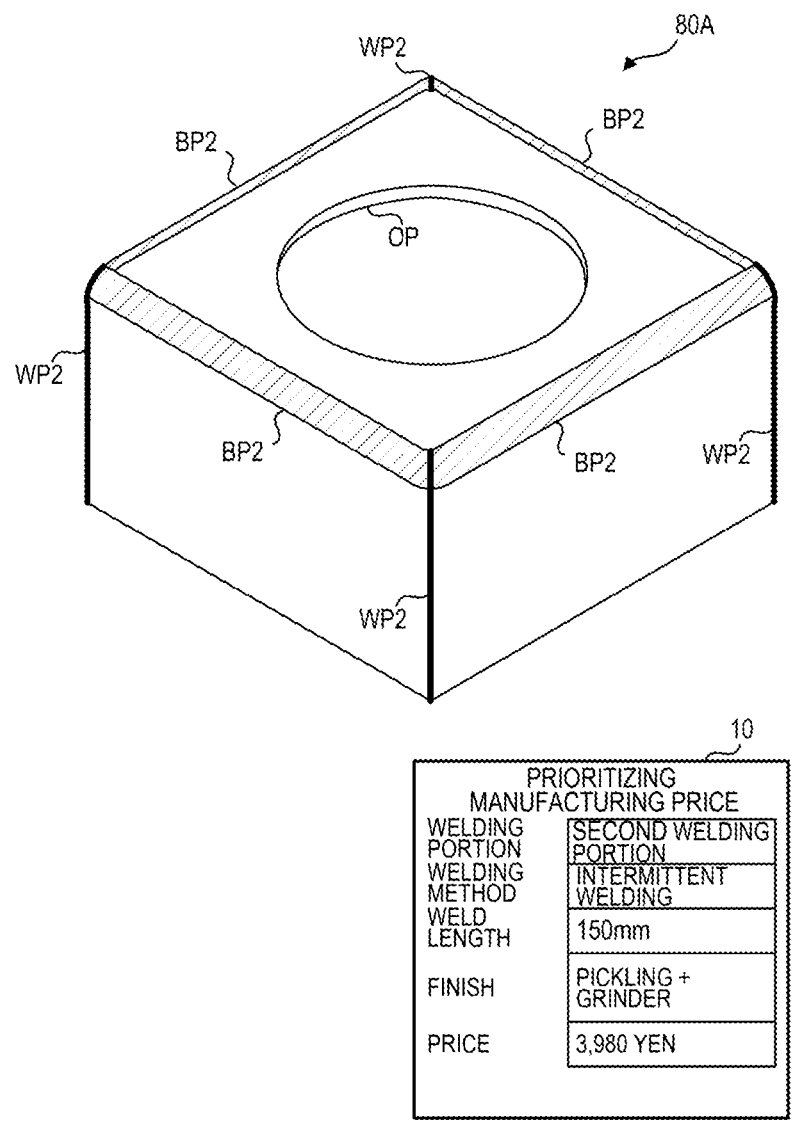
FIG. 7 is a schematic diagram illustrating a second three-dimensional pattern image.
Figure 8:
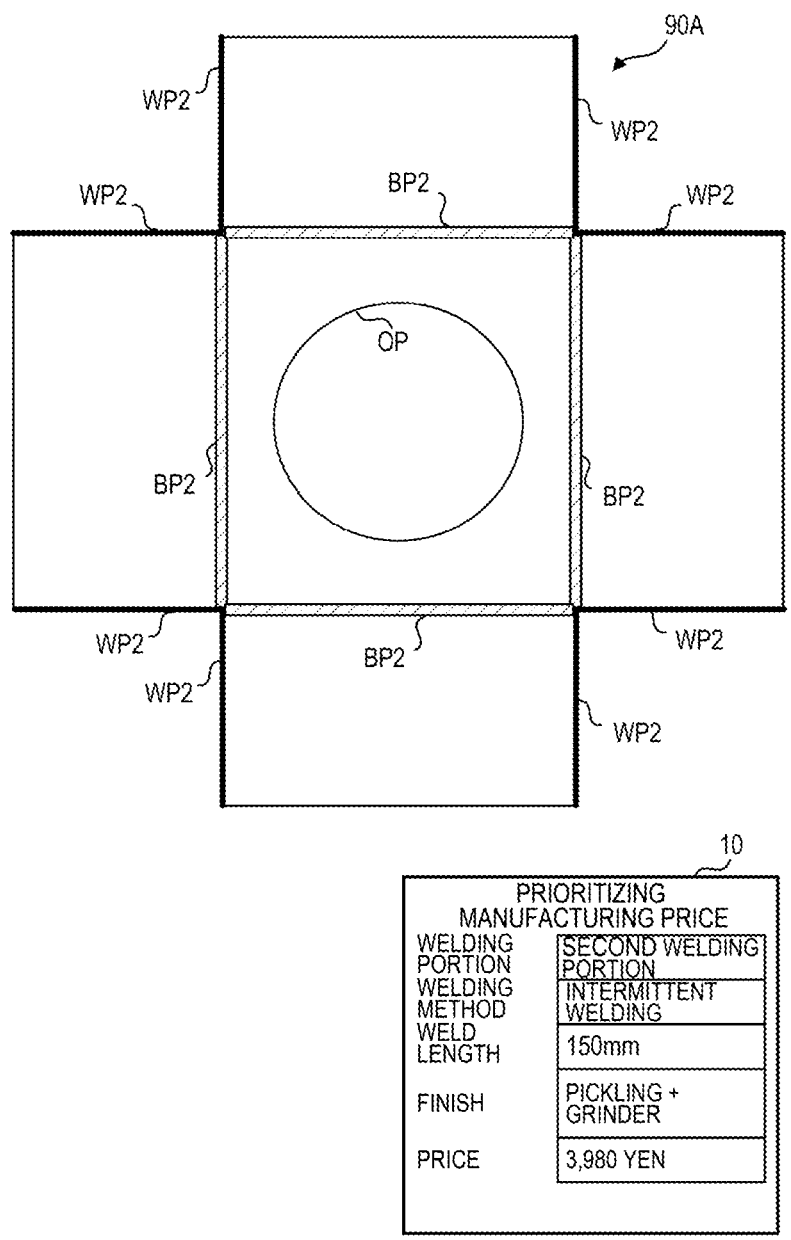
FIG. 8 is a schematic diagram illustrating a second two-dimensional pattern image.

FIG. 7 illustrates a second three-dimensional pattern image 80A as a three-dimensional image which is an example of the second machining pattern image in which the second welding portions WP2 and a second bending portions BP2 are indicated. FIG. 8 illustrates a second two-dimensional pattern image 90A as a two-dimensional image that is another example of the second machining pattern image created by the generation part 22G. Incidentally, in the following description, the first three-dimensional pattern image 60A and the first two-dimensional pattern image 70A are also simply referred to as the first machining pattern images. The second three-dimensional pattern image 80A and the second two-dimensional pattern image 90A are also simply referred to as the second machining pattern images.

The article illustrated in FIG. 4 is a substantially box-shaped article in which a circular opening OP is formed on a top plane (or an upper plane), and has no bottom plane. As illustrated in FIG. 4, a welding portion and a bending portion are not illustrated in the initial three-dimensional image 10A created by the generation part 22G at the initial stage based on the model data D1. Therefore, a ridge line which is a boundary line of each plane, has a corner that is not rounded.

The generation part 22G generates the first three-dimensional pattern image 60A (FIG. 5) based on the model data D1 and the first welding portion WP1 and the first bending portion BP1 specified by the specification part 22B. The first three-dimensional pattern image 60A is an imaginary diagram of a finished product. Therefore, the user can examine the quotation result while viewing the first three-dimensional pattern image 60A representing the finished product. The generation part 22G generates the first two-dimensional pattern image 70A (FIG. 6) based on the model data D1 and the first welding portion WP1 and the first bending portion BP1 specified by the specification part 22B. Incidentally, the generation part 22G may generate only the first three-dimensional pattern image 60A or may generate only the first two-dimensional pattern image 70A. When there is no bending portion, the generation part 22G generates the first three-dimensional pattern image 60A and the first two-dimensional pattern image 70A based on the model data D1 and the first welding portion WP1 specified by the specification part 22B.

As illustrated in FIG. 5, in the first three-dimensional pattern image 60A generated by the generation part 22G, the first welding portions WP1 and the first bending portions BP1 are indicated. Further, in the article illustrated in FIG. 5, since five plates of which five planes are separated are welded, the corners are less rounded, and the good appearance is maintained. Incidentally, in the following example, the first welding portions WP1 and the second welding portions WP2 are indicated by thick lines, and the first bending portions BP1 and the second bending portions BP2 are indicated by hatching. However, the first welding portions WP1 and the second welding portions WP2, and the first bending portions BP1 and the second bending portions BP2 may be indicated in the aspect that they can be visually distinguished from each other. For example, the two may be distinguished by different colors or different line types.

As illustrated in FIG. 6, the first welding portions WP1 and the first bending portions BP1 are also indicated in the first two-dimensional pattern image 70A generated by the generation part 22G. Incidentally, the first three-dimensional pattern image 60A illustrated in FIG. 5 represents a finished product and thus does not include a welding margin or an expansion margin. The first two-dimensional pattern image 70A illustrated in FIG. 6 also does not include a welding margin or an expansion margin. However, the generation part 22G may generate the first two-dimensional pattern image 70A so as to include a welding margin or an expansion margin.

As illustrated in FIG. 7, in the second three-dimensional pattern image 80A generated by the generation part 22G, the second welding portions WP2 and the second bending portions BP2 are indicated. Since the plate-shaped member of which the five planes are integrated is bent and then welded, the corners are rounded, and the beautiful appearance is impaired. On the other hand, since a welding length is short as compared with the case of welding five plates separated from each other by five planes, the manufacturing price is further reduced. As illustrated in FIG. 8, in the second two-dimensional pattern image 90A generated by the generation part 22G, the second welding portions WP2 and the second bending portions BP2 are indicated. Incidentally, the second three-dimensional pattern image 80A illustrated in FIG. 7 represents a finished product and thus does not include a welding margin or an expansion margin. The second two-dimensional pattern image 90A illustrated in FIG. 8 also does not include a welding margin or an expansion margin. However, the generation part 22G may generate the second two-dimensional pattern image 90A so as to include a welding margin or an expansion margin.

[Provision Unit]

Returning to FIG. 2, the provision part 22H provides the first machining pattern image and the second machining pattern image to the user. Accordingly, the user can visually compare articles manufactured according to different conditions. In particular, when the first and second machining pattern images are three-dimensional pattern images, the rounded or welded corners of the manufactured article are reproduced in the three-dimensional pattern image. Therefore, the user can visually compare shapes of articles manufactured according to different conditions.

In addition, the provision part 22H provides the user with information indicating the first price and information indicating the second price based on the quotation information created by the quotation part 22D together with the first machining pattern image and the second machining pattern image. As an example, as illustrated in FIG. 5, the provision part 22H displays the first three-dimensional pattern image 60A and the welding setting section 10 side by side. In the welding setting section 10, a first price of 4980 yen of the article in the case of welding the first welding portions WP1 is displayed. As illustrated in FIG. 7, the provision part 22H displays the second three-dimensional pattern image 80A and the welding setting section 10 side by side. In the welding setting section 10, a second price of 3980 yen of the article in the case of welding the second welding portions WP2 is displayed.

As a result, the provision part 22H provides the user with the quotation information and the first and second machining pattern images, and provides the user with information indicating the first and second prices. Therefore, the user can determine whether the quotation is correct while confirming the machining pattern images. Furthermore, the provision part 22H may provide the user with the further machining pattern image generated by the generation part 22G and information indicating a price of an article corresponding to the further machining pattern image. Alternatively, when displaying the first and second machining pattern images, the provision part 22H may display the quotation screens (FIG. 3) corresponding to the first and second machining pattern images side by side.

Alternatively, the provision part 22H may provide the user with the first and second machining pattern images and the information indicating the first and second prices by transmitting them to the client terminal 40. Furthermore, the provision part 22H may cause the display device 46 to display the first and second machining pattern images side by side. In this case, the provision part 22H may display the information indicating the first and second prices on the display device 46 side by side with the first and second machining pattern images. Furthermore, the provision part 22H may display the further machining pattern image generated by the generation part 22G on the display device 46 side by side with the first and second machining pattern images. Furthermore, the provision part 22H may cause the display device 46 to display the information indicating the price of the article corresponding to the further machining pattern image side by side with the information indicating the first and second prices.

Incidentally, in the priority condition, a priority order may be set. In this case, the provision part 22H may display the first and second machining pattern images so as to be arranged in the priority order. Similarly, the provision part 22H may display the pieces of information indicating the first and second prices so as to be arranged in the priority order. For example, an example in which the first condition is a condition prioritizing the good appearance of the article and the second condition is a condition prioritizing the manufacturing price of the article will be described. At this time, in a case where the first condition is prioritized over the second condition, the provision part 22H causes the second machining pattern image to be displayed so as to be arranged next to the first machining pattern image.

Furthermore, the first condition and the second condition may be conditions indicating different degrees based on the same criterion. For example, in a case where the first condition is a condition that the manufacturing price is the lowest and is prioritized over the second condition that the manufacturing price is the second lowest, the provision part 22H displays the second machining pattern image to be arranged next to the first machining pattern image. Furthermore, in a case where a plurality of machining pattern images are provided for each condition based on different criteria (for example, the manufacturing price and the good appearance), the provision part 22H may display a plurality of machining pattern images arranged separately for each criterion.

In addition, the provision part 22H provides the user with information indicating the first condition and information indicating the second condition together with the first machining pattern image and the second machining pattern image. As an example, in FIGS. 5 and 6, the provision part 22H displays the first machining pattern image and the welding setting section 10 side by side. The welding setting section 10 includes a character string "prioritize appearance" as the information indicating the first condition. In FIGS. 7 and 8, the provision part 22H displays the second machining pattern image and the welding setting section 10 side by side. The welding setting section 10 includes a character string "prioritize manufacturing price" as the information indicating the second condition. Incidentally, the information indicating the first and second conditions may be an image, a symbol, a number, and the like.

Furthermore, the provision part 22H may provide the first machining pattern image and the second machining pattern image to the manufacturer. For example, the provision part 22H provides the first machining pattern image and the second machining pattern image by causing the display part of the terminal used by the manufacturer to display these images. Thus, the manufacturer can manufacture or machine the article while viewing the three-dimensional pattern image of the finished product. Alternatively, the provision part 22H may provide these images by transmitting the first machining pattern image and the second machining pattern image to the terminal used by the manufacturer.

[Client Terminal]

Figure 2:
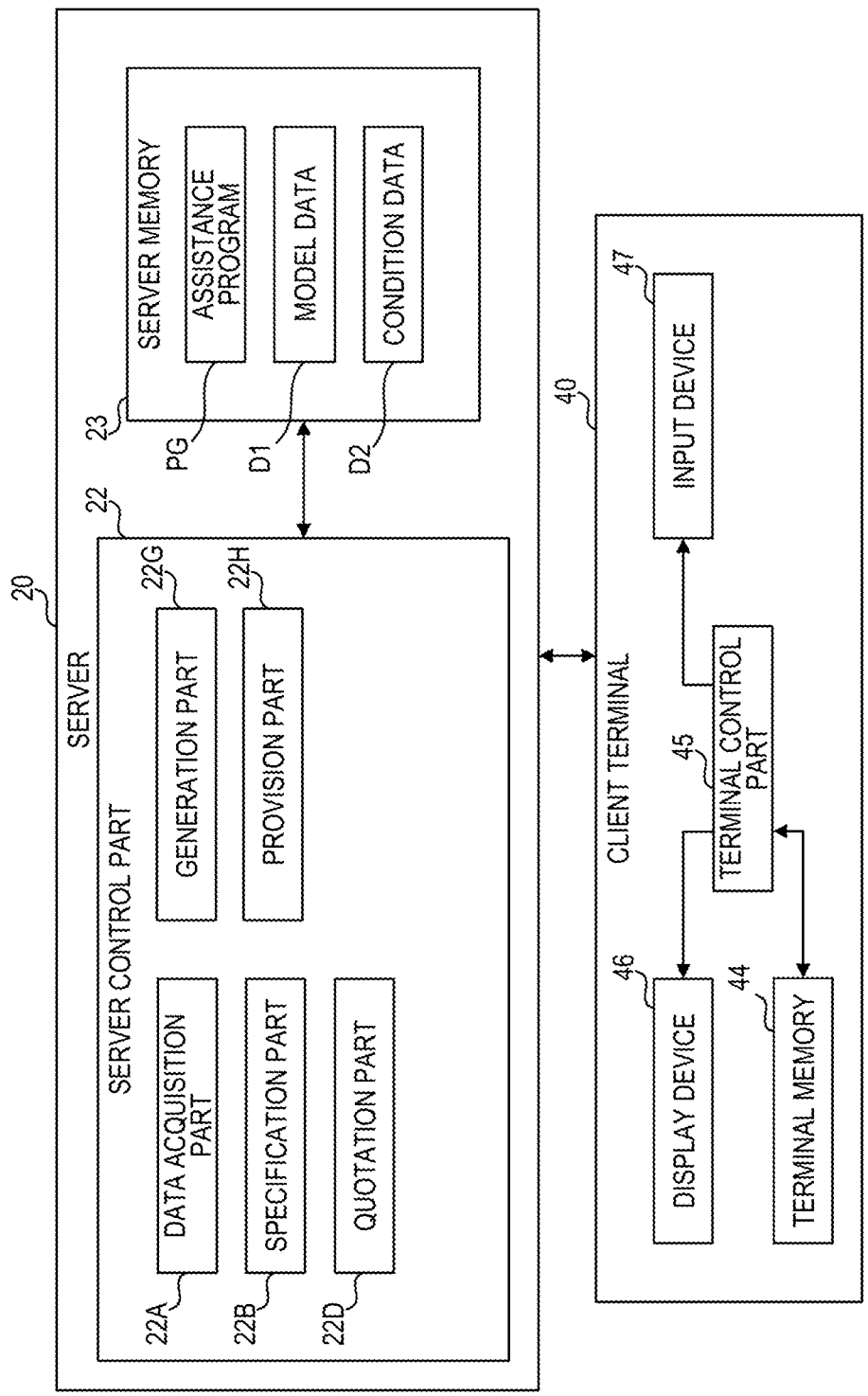
FIG. 2 is a schematic block diagram of an assistance system.

As illustrated in FIG. 2, the client terminal 40 includes a terminal control part 45 that controls the client terminal 40 and a terminal memory 44 that stores a control program. The terminal control part 45 is a computer in which a processor, that executes various arithmetic processes and operation control according to a predetermined program, and other peripheral devices are combined. The client terminal 40 further includes the display device 46 and an input device 47.

As an example, the processor of the terminal control part 45 is, for example, a CPU or an MPU, and controls the entire device based on the control program stored in the terminal memory 44 and also controls various processes in an integrated manner. The terminal memory 44 further includes a RAM that is a system work memory for the processor to operate, and a storage device such as a ROM, an HDD, and an SSD that store a program and system software. In the following description, an example in which the CPU executes processing operations such as various calculations, controls, and determinations according to the control program stored in the ROM or the HDD will be described. Incidentally, the terminal control part 45 can also perform control according to a program stored in a portable recording medium such as a CD, a DVD, a CF card, and a USB memory, or an external storage medium such as a cloud server on the Internet.

The terminal memory 44 is an external storage device including a non-volatile storage medium (non-transitory computer-readable storage medium) such as a hard disk and a semiconductor storage device. Furthermore, in addition to the control program, the terminal memory 44 stores a design program for creating the model data D1 such as CAD software, and various programs such as a web browser.

The input device 47 is a keyboard, a numeric keypad, or a touch panel. The user creates or changes the model data D1 by using the input device 47. Then, the model data D1 created by using the input device 47 is recorded in the terminal memory 44. When the information such as the quotation information and the machining pattern image are received from the server 20, the display device 46 displays the information such as the quotation information and the machining pattern image. Further, the display device 46 displays web pages such as the setting screen, the quotation screen, and the order screen. The user places an order for the article according to the web page displayed on the display device 46.

[Assistance Process]

Figure 9:
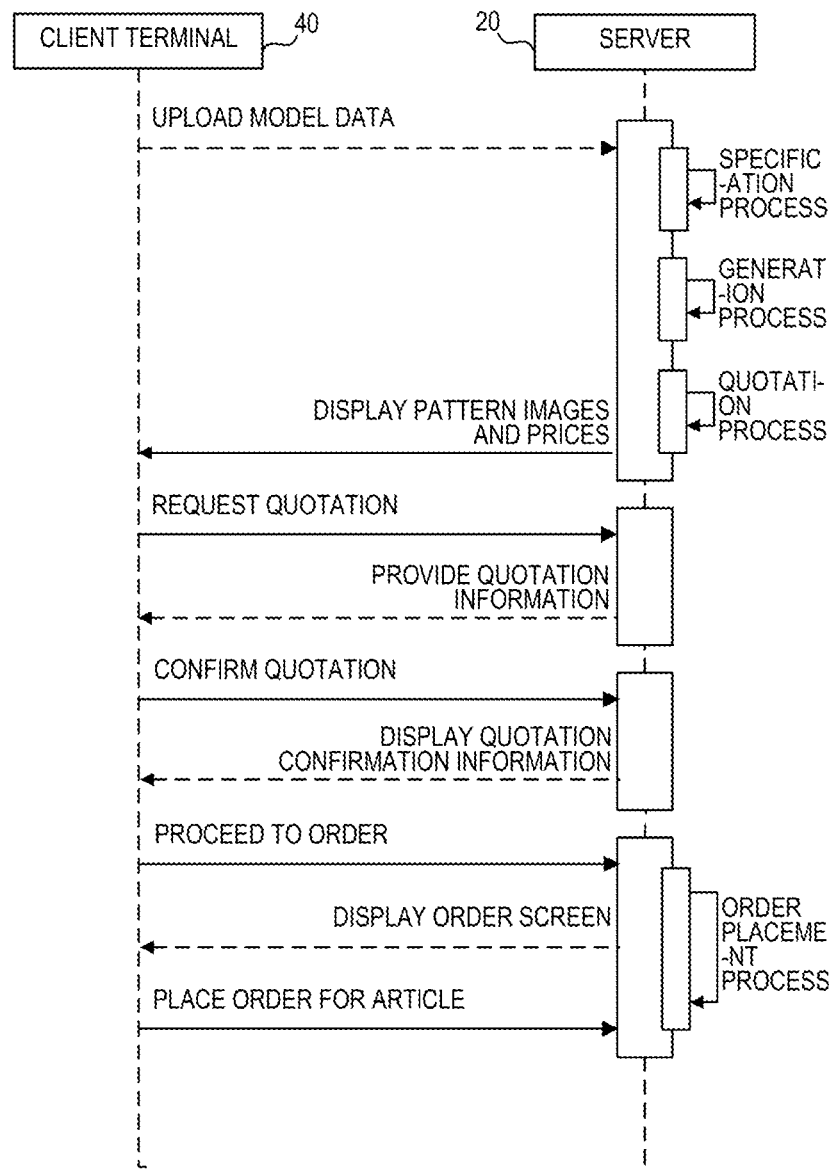
FIG. 9 is a sequence diagram of quotation processing.

Next, an assistance process will be described with reference to FIG. 9. First, the user uploads the model data D1 to the server 20. Then, the server control part 22 of the server 20 stores the model data D1 in the server memory 23, and the data acquisition part 22A acquires the model data D1. When the data acquisition part 22A acquires the model data D1, a specification process is performed. Specifically, in the specification process, the specification part 22B specifies the first welding portion WP1 according to the first condition, and specifies the second welding portion WP2 according to the second condition. Further, the specification part 22B specifies the first bending portion BP1 according to the first condition, and specifies the second bending portion BP2 according to the second condition. Then, the specification part 22B creates pattern data in which the first welding portion WP1 and the second welding portion WP2, and the first bending portion BP1 and the second bending portion BP2 are specified, and stores the pattern data in the server memory 23.

Next, the generation part 22G performs a generation process of generating the first and second machining pattern images. In the generation process, the generation part 22G generates the first machining pattern image in which the first welding portion WP1 and the first bending portion BP1 are indicated, based on the pattern data. The generation part 22G generates the second machining pattern image in which the second welding portion WP2 and the second bending portion BP2 are indicated, based on the pattern data. Then, the generation part 22G stores the first and second machining pattern images in the server memory 23.

Subsequently, the quotation part 22D performs a quotation process of creating the quotation information including the first price of the article when the first welding portions WP1 are welded and the second price of the article when the second welding portions WP2 are welded. Then, the quotation part 22D stores the quotation information in the server memory 23. As an example, the quotation part 22D creates the welding setting section 10 including the price of the article for the article corresponding to each of the first and second machining pattern images. Then, the provision part 22H provides the user with the first machining pattern image and the second machining pattern image, and provides the user with the information indicating the first price and the information indicating the second price. As an example, the provision part 22H causes the display device 46 to display the welding setting section 10 including the first price of the article side by side with the first machining pattern image. In addition, the provision part 22H causes the display device 46 to display the welding setting section 10 including the second price of the article side by side with the second machining pattern image.

The user checks the first and second machining pattern images and the first and second prices. Then, a machining pattern image is selected, and quotation of the article corresponding to the selected machining pattern image is requested. As an example, when the user selects a quotation icon, a quotation request is transmitted from the client terminal 40 to the server 20. Upon receiving the quotation request, the quotation part 22D creates the quotation screen (FIG. 3). Then, the provision part 22H provides the user with the quotation information by displaying the quotation screen on the display device 46.

Further, when the user selects the confirm button 14 for the quotation, the provision part 22H displays the total monetary amount, the ship date, and the number of days of actual work days required until shipment, as quotation confirmation information. Then, when the user selects the order button 18 on the quotation screen and proceeds to order, the quotation part 22D of the server 20 executes the order placement process, and the server control part 22 displays the order screen on the display device 46. Then, when the user places an order for the article, the quotation part 22D transmits the specified model number and purchase quantity to the manufacturer.

According to the assistance system 100 according to the first embodiment described above, it is possible to provide a user with a plurality of machining pattern images indicating a welding portion corresponding to a plurality of mutually different priority conditions. Therefore, the user can compare the respective machining pattern images to set a machining condition (for example, a welding portion) of the article.

Second Embodiment

A second embodiment will be described with reference to FIGS. 10 to 15. The second embodiment is different from the first embodiment in that a reduced machining pattern image is displayed. Incidentally, in the description of the second embodiment, differences from the first embodiment will be described. The already described components are denoted by the same reference signs, and the description thereof will be omitted. Unless otherwise described, the components denoted by the same reference signs provide substantially the same operation and function, and the functions and effects thereof are also substantially the same.

When the user uploads the model data D1 to the server 20, the server control part 22 stores the model data D1 in the server memory 23. Before and after the upload, the server control part 22 causes the display device 46 to display a selection section for selecting a machining target. For example, the machining target is a cutting plate, a sheet metal component, a welding component, cutting machining, 3D printing, or the like. Then, the server control part 22 specifies the selected machining target according to an operation such as button selection by the user. Incidentally, the user may select a plurality of types of machining targets (for example, a sheet metal component and a welding component). Furthermore, the server control part 22 may cause the display device 46 to display an explanatory sentence of the machining target selected by the user.

When a welding component is selected as a machining target, the data acquisition part 22A acquires the model data D1, and the specification part 22B performs the specification process. Further, the specification part 22B creates the pattern data and stores the pattern data in the server memory 23. Then, the generation part 22G performs the generation process, and generates a plurality of machining pattern images based on the pattern data. For example, the generation part 22G generates a first machining pattern image, a second machining pattern image, a third machining pattern image, a fourth machining pattern image, and a fifth machining pattern image so as to indicate the welding portion specified by the specification part 22B. Incidentally, the generation part 22G may generate fewer than three machining pattern images or more than five machining pattern images. Thereafter, the server control part 22 causes the display device 46 to display a button for proceeding to the quotation (for example, a "proceed to next" button).

Figure 10:
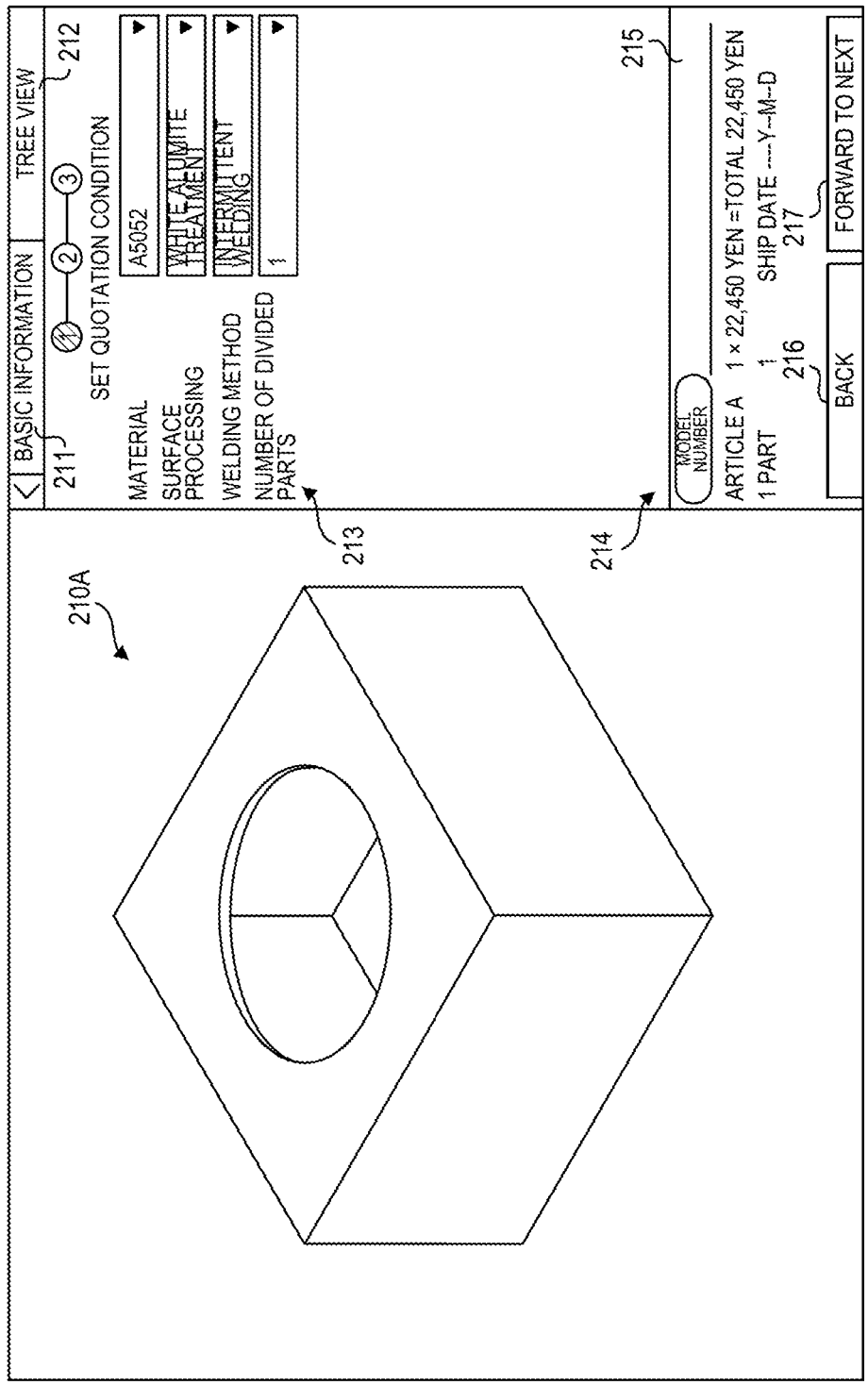
FIG. 10 is a schematic diagram illustrating a quotation condition setting screen.

When the user selects the button for proceeding to the quotation, the server control part 22 causes an explanatory sentence of the quotation to be displayed on the display device 46. The explanatory sentence of the quotation is, for example, a sentence "quotation is made in three steps. First, please set the quotation condition in step 1". When the user closes the explanatory sentence, the provision part 22H causes the display device 46 to display a quotation condition setting screen (FIG. 10). On the left side of FIG. 10, an initial three-dimensional image 210A created by the generation part 22G based on the model data D1 uploaded by the user is indicated. In the initial three-dimensional image 210A, a welding portion and a bending portion are not indicated. Incidentally, the initial three-dimensional image 210A is a three-dimensional model in which an observation direction can be changed by rotating the image. Alternatively, the initial three-dimensional image 210A may be a two-dimensional image.

A quotation section is displayed on the right side of FIG. 10. A basic information tab 211 and a tree view tab 212 are included at the upper part of the quotation section. In the example of FIG. 10, a quotation condition setting section 213 to be displayed by selecting the basic information tab 211 is illustrated. The current step is displayed below the basic information tab 211 and the tree view tab 212. In the example of FIG. 10, the numbers of steps 1 to 3 are displayed, and step 1 which is the current step is indicated by hatching.

The user can select a material of the article, a type of surface processing applied to the article, a welding method, and a number of divided parts to be welded in the quotation condition setting section 213. In the example of FIG. 10, a material symbol "A 5052" indicating an aluminum alloy is selected as the material. "White alumite treatment" is selected as the surface processing. "Intermittent welding" is selected as the welding method. As the number of divided parts, the number "1" indicating the number of one part is selected. As an example, in the quotation condition setting section 213, each condition can be selected by a form of a pull-down menu. Alternatively, an input section for inputting each condition may be provided in the quotation condition setting section 213. Furthermore, a button and the like for selecting each condition may be provided in the quotation condition setting section 213.

When the user selects a quotation condition in the quotation condition setting section 213, the quotation part 22D performs quotation processing of creating the quotation information including a rough quoted price. Then, the quotation part 22D causes the server memory 23 to store the quotation information. In addition, a quotation result section 214 for displaying a quotation result is provided at the lower part of the quotation screen. Then, when the user selects the quotation condition in the quotation condition setting section 213, the total monetary amount as the rough quoted price, the ship date, etc., are displayed in the quotation result section 214. For example, the total monetary amount is an amount obtained by multiplying the price of the article by the purchase quantity.

A back button 216 and a forward button 217 are displayed below the quotation result section 214. When the user selects the back button 216, the previous screen (for example, a screen on which an explanatory sentence of the quotation is displayed) is displayed again. When the user selects the forward button 217, the next screen (for example, a pattern image screen illustrated in FIG. 11) is displayed. Incidentally, the forward button 217 may be displayed after the user selects the quotation condition. Alternatively, the forward button 217 may be selectable after the user selects the quote condition, and in this case, before the user selects the quote condition, the next screen is not displayed even when the user selects the forward button 217.

Figure 11:
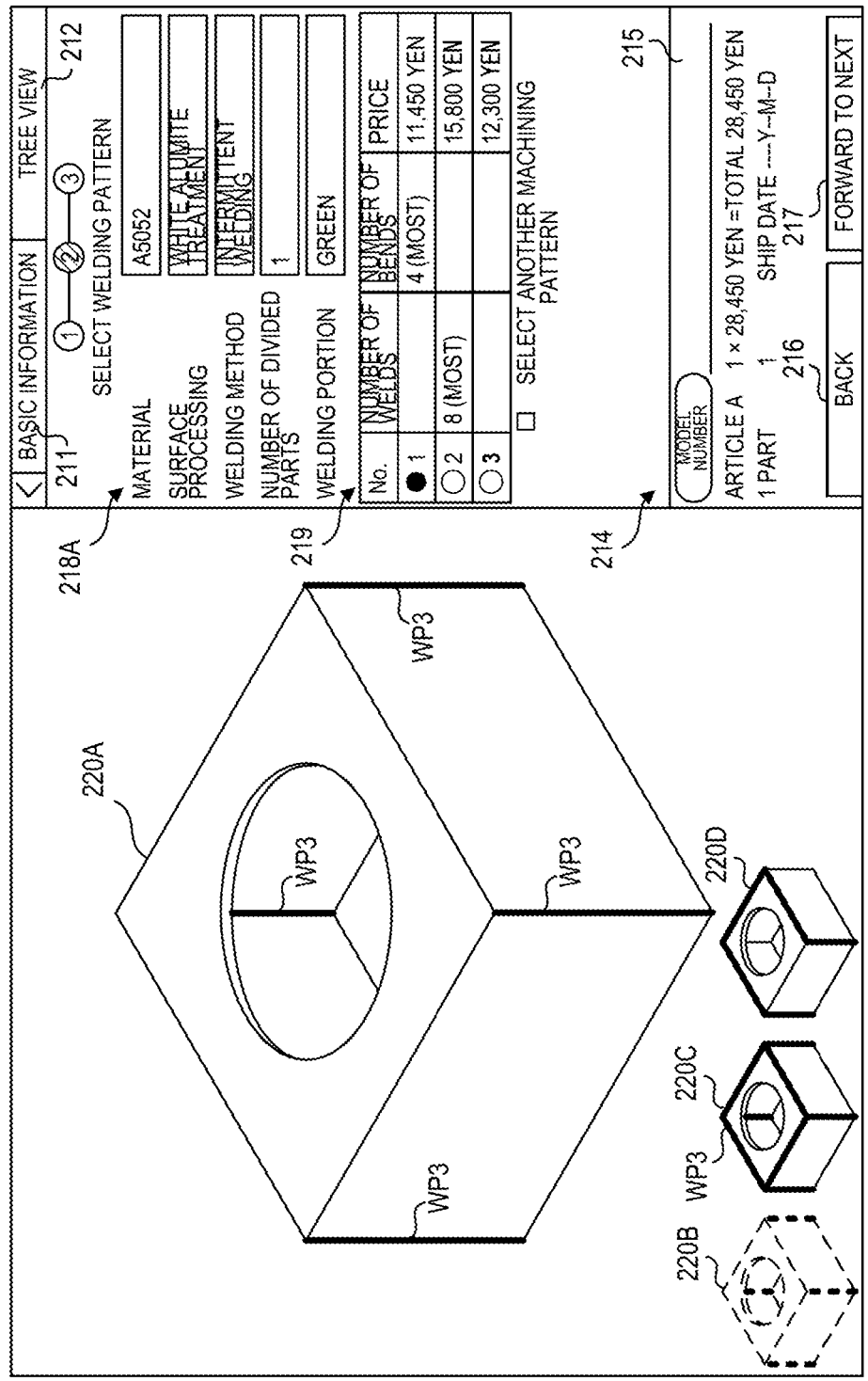
FIG. 11 is a schematic diagram illustrating an example of a pattern image screen.

FIG. 11 illustrates an example of a pattern image screen on which a plurality of three-dimensional pattern images are displayed. When the user selects the forward button 217 on the quotation condition setting screen, the provision part 22H causes the display device 46 to display the pattern image screen. On the left side of FIG. 11, a first three-dimensional pattern image 220A is indicated as a three-dimensional image that is an example of the first machining pattern image created by the generation part 22G. Welding portions WP3 are indicated in the first three-dimensional pattern image 220A. As an example, the welding portions WP3 are indicated by a color (for example, green) different from other portions. Incidentally, in the example of FIG. 11, the welding portions WP3 indicated by green are indicated by thick lines. Further, the color indicating the welding portions WP3 is not limited to green, and an arbitrary color may be set by the user or the administrator of the server 20. Incidentally, the first three-dimensional pattern image 220A is a three-dimensional model in which the observation direction can be changed by rotating the image. Alternatively, the first three-dimensional pattern image 220A may be a two-dimensional image.

The provision part 22H causes the display device 46 to display the first three-dimensional pattern image 220A as the first machining pattern image and a second three-dimensional pattern image 220C as the second machining pattern image, and provides the user with the first three-dimensional pattern image 220A and the second three-dimensional pattern image 220C. Furthermore, the provision part 22H displays one (for example, the first three-dimensional pattern image 220A) selected by the user from the first three-dimensional pattern image 220A and the second three-dimensional pattern image 220C to be larger than the other. As an example, the provision part 22H displays a plurality of reduced machining pattern images below the first three-dimensional pattern image 220A. As a result, the user can confirm the machining pattern image selected and displayed in a large size in detail. At the same time, the user can compare the selected machining pattern image with other machining pattern images displayed in a small size. Incidentally, in the example of FIG. 11, the first three-dimensional pattern image 220A is selected as an initial setting.

In the example of FIG. 11, a first three-dimensional pattern image 220B is displayed as the reduced first three-dimensional pattern image 220A. The first three-dimensional pattern image 220B is displayed in an aspect different from other three-dimensional pattern images in order to indicate that the first three-dimensional pattern image 220B corresponds to the selected first three-dimensional pattern image 220A. The different aspect is an aspect in which at least one of a color, a brightness, a line thickness, a line type, etc., is different. In the example of FIG. 11, the first three-dimensional pattern image 220B is displayed by a broken line. Incidentally, the plurality of reduced machining pattern images may be a three-dimensional model in which the observation direction can be changed by rotating the image. The plurality of reduced machining pattern images may be two-dimensional images.

In the example of FIG. 11, a reduced second three-dimensional pattern image 220C is displayed as a three-dimensional image that is an example of the second machining pattern image. Furthermore, a reduced third three-dimensional pattern image 220D is displayed as a three-dimensional image that is an example of the third machining pattern image. In the first three-dimensional pattern image 220B, the second three-dimensional pattern image 220C, and the third three-dimensional pattern image 220D, the welding portions WP3 based on the specification of the specification part 22B are indicated. As an example, the welding portions WP3 are indicated by a color (for example, green) different from other portions. In the example of FIG. 11, the welding portions WP3 indicated by green are indicated by thick lines. Incidentally, instead of the plurality of reduced machining pattern images, a plurality of machining pattern images may be displayed in the same size.

In addition, a quotation section is displayed on the right side of FIG. 11. The basic information tab 211 and the tree view tab 212 are included at the upper part of the quotation section. In the example of FIG. 11, a quotation condition section 218A to be displayed by selecting the basic information tab 211 is illustrated. The current step is displayed below the basic information tab 211 and the tree view tab 212. In the example of FIG. 11, the numbers of steps 1 to 3 are displayed, and step 2 which is the current step is indicated by hatching.

The user can confirm a material of the article, a type of surface processing applied to the article, a welding method, and the number of divided parts to be welded in the quotation condition section 218A. In the quotation condition section 218A, the color of the welding portions WP3 indicated in the machining pattern image such as the first three-dimensional pattern image 220A is displayed. In the example of FIG. 11, green is displayed as the color of the welding portions WP3. Incidentally, a color sample may be displayed as the color of the welding portions WP3.

Furthermore, when the pattern image screen is displayed, the quotation part 22D refers to a machining condition corresponding to the machining pattern image selected as the initial setting, and performs the quotation processing of creating the quotation information including a quoted price. Then, the quotation part 22D stores the quotation information in the server memory 23. The total monetary amount as the quoted price, the ship date, etc., are displayed in the quotation result section 214. For example, the quoted price is corrected so as to increase or decrease according to the increase or decrease in the number of times of welding and the number of times of bending.

A machining condition section 219 indicating the machining condition corresponding to each machining pattern image displayed on the pattern image screen is displayed below the quotation condition section 218A. Specifically, the machining condition section 219 displays numbers 1 to 3 indicating the first three-dimensional pattern image 220B, the second three-dimensional pattern image 220C, and the third three-dimensional pattern image 220D, respectively. In addition, the number of times of welding, the number of times of bending, and the price are displayed as the machining condition corresponding to each machining pattern image. Incidentally, in the example of FIG. 11, only the largest number of times of welding and the largest number of times of bending are displayed. Alternatively, the number of times of welding and the number of times of bending may be displayed for all the machining pattern images.

In the machining condition section 219, the user can select the machining pattern image. As a result, the welding portion WP3 indicated in the machining pattern image is set for quotation. That is, the user can set the welding portion WP3 through the selection of the machining pattern image. Specifically, the user can select the machining pattern image by checking a check box arranged side by side with the number indicating each machining pattern image. In the example of FIG. 11, the first three-dimensional pattern images 220A and 220B are selected by default. As an example, the machining pattern image including the welding portion WP3 specified according to the priority condition (for example, the first condition) is selected by default. Then, when the user selects the second three-dimensional pattern image 220C, the second three-dimensional pattern image 220C is displayed large like the first three-dimensional pattern image 220A. Alternatively, the screen may be configured such that the machining pattern image can be selected by an operation of clicking the reduced machining pattern image and the like.

Figure 12:
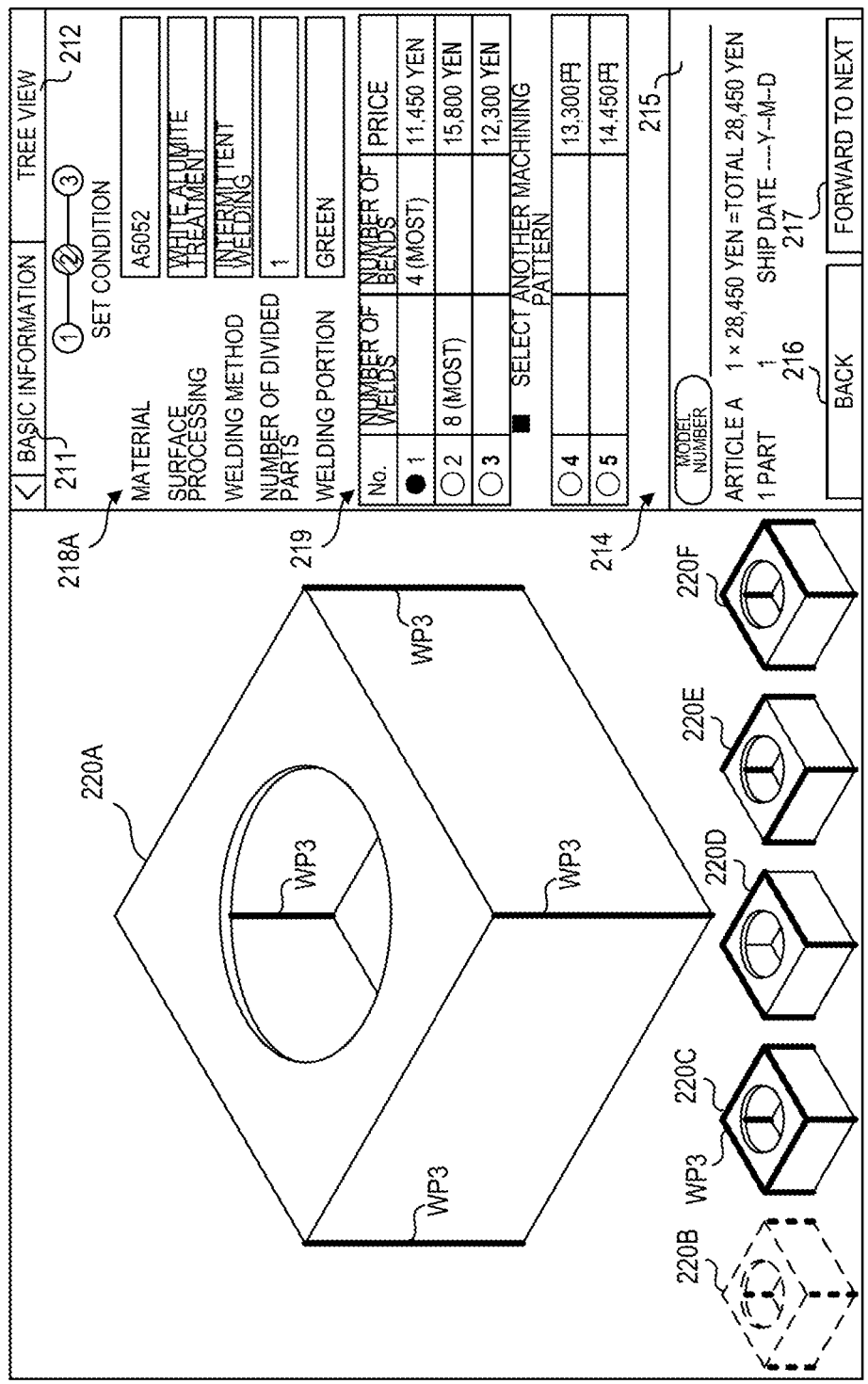
FIG. 12 is a schematic diagram illustrating another example of the pattern image screen.

A check box for displaying another machining pattern image is displayed at the lower part of the quotation condition section 218A. When the user checks the check box arranged side by side with the sentence "select another machining pattern", another machining pattern image is displayed as illustrated in FIG. 12. Incidentally, in the example of FIG. 11, three machining pattern images are displayed as an initial setting. Alternatively, all the machining pattern images may be displayed as an initial setting. Furthermore, in a case where the number of machining pattern images to be generated is smaller than the initially set number (for example, three), the step of displaying another machining pattern image can be omitted.

FIG. 12 illustrates another example of a pattern image screen on which a plurality of three-dimensional pattern images are displayed. Specifically, when the user checks the check box for displaying the other machining pattern image, the provision part 22H causes the display device 46 to display a screen illustrated in FIG. 12. In the pattern image screen illustrated in FIG. 12, five machining pattern images are displayed. Specifically, a reduced fourth three-dimensional pattern image 220E is further displayed as a three-dimensional image that is an example of a fourth machining pattern image. In addition, a reduced fifth three-dimensional pattern image 220F is further displayed as a three-dimensional image which is an example of a fifth machining pattern image.

The user can select another machining pattern image on the screen on which the further pattern image is displayed. The machining condition section 219 also displays numbers 4 and 5 indicating the fourth three-dimensional pattern image 220E and the fifth three-dimensional pattern image 220F, respectively. In the machining condition section 219, the number of times of welding, the number of times of bending, and the price corresponding to the fourth three-dimensional pattern image 220E and the fifth three-dimensional pattern image 220F are further displayed.

The back button 216 and the forward button 217 are displayed below the quotation result section 214. When the user selects the back button 216, the pattern image screen illustrated in FIG. 11 is displayed again. When the user selects the forward button 217, the next screen (for example, a welding portion confirmation screen illustrated in FIG. 15) is displayed. Incidentally, the forward button 217 may be displayed after the user selects the machining pattern image. Alternatively, the forward button 217 may be selectable after the user selects the machining pattern image, and in this case, before the user selects the machining pattern image, the next screen is not displayed even when the user selects the forward button 217.

[First Modification]

A first modification will be described with reference to FIGS. 13 and 14. In the first modification, the user can manually specify a welding portion instead of or in addition to specifying the welding portion by the specification part 22B. For example, the provision part 22H causes the display device 46 to display a specification screen in response to an operation by the user when uploading the model data D1. As an example, the operation by the user is an operation of selecting a button displayed on a screen for uploading the model data D1. Alternatively, the provision part 22H may cause the display device 46 to display the specification screen according to the setting by the user. For example, the setting by the user is a setting of a mode for manually specifying the welding portion.

Figure 13:
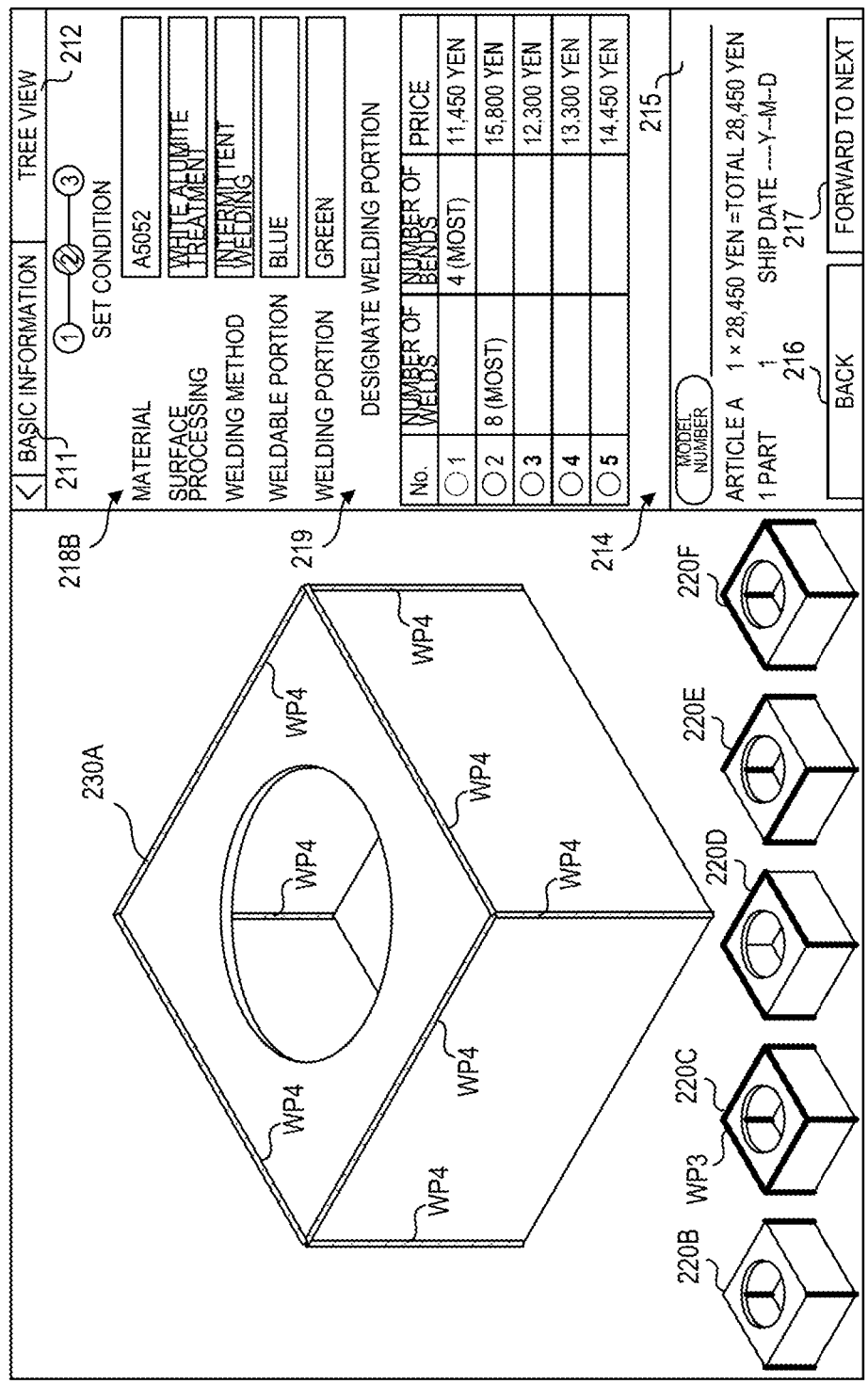
FIG. 13 is a schematic diagram illustrating a welding portion specification screen.
Figure 14:
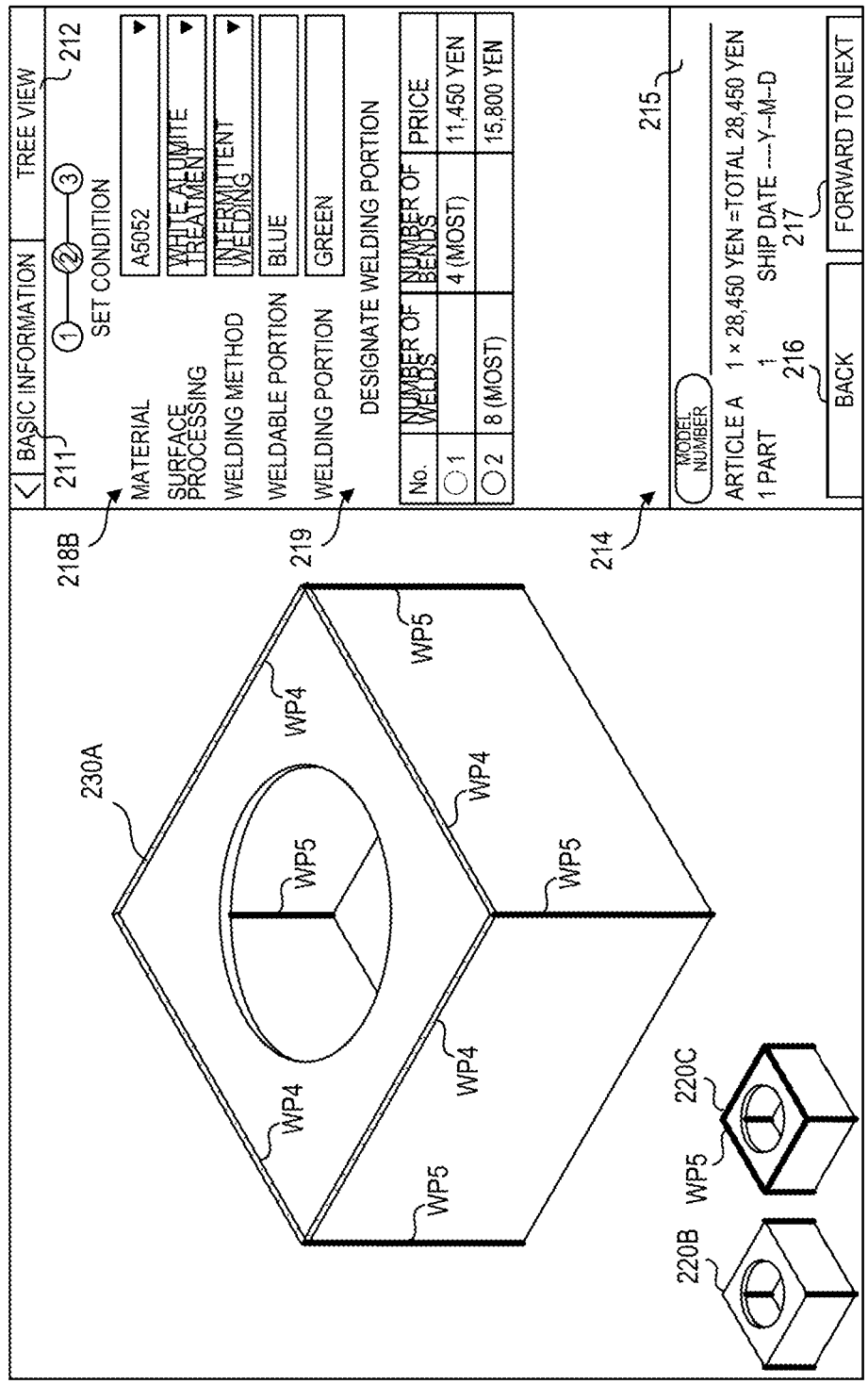
FIG. 14 is a schematic diagram illustrating a specification screen after designation of a welding portion.

On the left side of FIG. 13, a first three-dimensional pattern image 230A is illustrated as a three-dimensional image that is an example of the first machining pattern image created by the generation part 22G. In the first three-dimensional pattern image 230A, weldable portions WP4 are indicated. As an example, the weldable portions WP4 are indicated by a color (for example, blue) different from other portions. Incidentally, in the example of FIG. 13, the weldable portions WP4 indicated in blue are indicated by hatching. The color indicating the weldable portions WP4 are not limited to blue, and an arbitrary color may be set by the user or the administrator of the server 20. Incidentally, the first three-dimensional pattern image 230A is a three-dimensional model in which the observation direction can be changed by rotating the image. Alternatively, the first three-dimensional pattern image 230A may be a two-dimensional image.

The user specifies third welding portion WP5 by clicking and designating the weldable portion WP4. The specification part 22B further specifies a third welding portion according to the designation by the user, and the generation part 22G generates the first machining pattern image in which the third welding portion WP5 is indicated. In addition, the provision part 22H causes an operation explanatory sentence to be displayed when displaying the specification screen. As an example, the operation explanatory sentence is a sentence "please click on the weldable portion". Furthermore, a plurality of reduced machining pattern images are displayed below the first three-dimensional pattern image 230A. As a result, the user can designate the weldable portions WP4 while viewing the welding portions WP3 (the thick line portions in FIG. 13) in the machining pattern image.

In addition, a quotation section is displayed on the right side of FIG. 13. The basic information tab 211 and the tree view tab 212 are included at the upper part of the quotation section. In the example of FIG. 13, a quotation condition section 218B to be displayed by selecting the basic information tab 211 is illustrated. The current step is displayed below the basic information tab 211 and the tree view tab 212. In the example of FIG. 13, the numbers of steps 1 to 3 are displayed, and step 2 which is the current step is indicated by hatching.

The user can confirm a material of the article, a type of surface processing applied to the article, and a welding method in the quotation condition section 218B. In the quotation condition section 218B, the color (green in FIG. 13) of the welding portions WP3 indicated in the machining pattern image such as the first three-dimensional pattern image 230A is displayed. Further, in the quotation condition section 218B, the color (blue in FIG. 13) of the weldable portions WP4 indicated in the first three-dimensional pattern image 230A is displayed. Incidentally, a color sample may be displayed as the colors of the welding portions WP3 and the weldable portions WP4.

The specification part 22B further specifies a third welding portion according to the designation by the user. That is, when the user designates the weldable portion WP4, the specification part 22B specifies the designated weldable portion WP4 and the third welding portion WP5 (FIG. 14). Then, the specification part 22B creates the specified pattern data and causes the server memory 23 to store the created pattern data. Next, the generation part 22G generates the first three-dimensional pattern image 230A as the first machining pattern image in which the third welding portions WP5 are indicated. Subsequently, as illustrated on the left side of FIG. 14, the provision part 22H causes the first three-dimensional pattern image 230A to be displayed so that the third welding portions WP5 are reflected.

Further, the provision part 22H makes a display aspect of the plurality of machining pattern images different from each other so that the machining pattern image including the third welding portion WP5 designated by the user stands out among the plurality of reduced machining pattern images compared to before the designation of the weldable portion WP4. In the example of FIG. 14, the provision part 22H causes only the reduced first three-dimensional pattern image 220B and the reduced second three-dimensional pattern image 220C, in which the third welding portions WP5 designated by the user are included, to be displayed. Alternatively, the machining pattern image including the third welding portion WP5 may be emphasized as compared with other machining pattern images to make the machining pattern image including the third welding portion WP5 stand out. For example, the emphasis of the machining pattern image can be realized by making a color, a brightness, a line type, a line thickness, or the like different from those of other machining pattern images.

As a result, when the third welding portion WP5 increases, the number of displayed machining pattern images decreases. Further, the provision part 22H causes the welding portion, that cannot be designated by the user, not to be displayed in the machining pattern image to be displayed as the weldable portion WP4. For example, when the machining pattern image including the third welding portion WP5 designated by the user is only the first three-dimensional pattern image 220B, the provision part 22H causes the welding portion, that is not specified by the specification part 22B according to the priority condition in the first three-dimensional pattern image 220B, not to be displayed as the weldable portion WP4.

Incidentally, the specification part 22B may specify only the third welding portion WP5 designated by the user as the welding portion instead of specifying the welding portion according to the priority condition. In this case, the generation part 22G generates the machining pattern image in which the third welding portion WP5 designated by the user is indicated. Then, the provision part 22H causes the display device 46 to display the machining pattern image.

The provision part 22H indicates only the machining condition corresponding to the machining pattern image including the third welding portion WP5 designated by the user in the machining condition section 219. In the example of FIG. 14, only the machining condition corresponding to the first three-dimensional pattern image 220B and the second three-dimensional pattern image 220C are indicated in the machining condition section 219. Furthermore, the back button 216 and the forward button 217 are displayed below the quotation result section 214. When the user selects the forward button 217, the next screen (for example, a welding portion confirmation screen illustrated in FIG. 15) is displayed. Incidentally, the forward button 217 may be displayed after the user designates the third welding portion WP5. Alternatively, the forward button 217 may be selectable after the user designates the third welding portion WP5, and in this case, before the user designates the third welding portion WP5, the next screen is not displayed even when the user selects the forward button 217.

Figure 15:
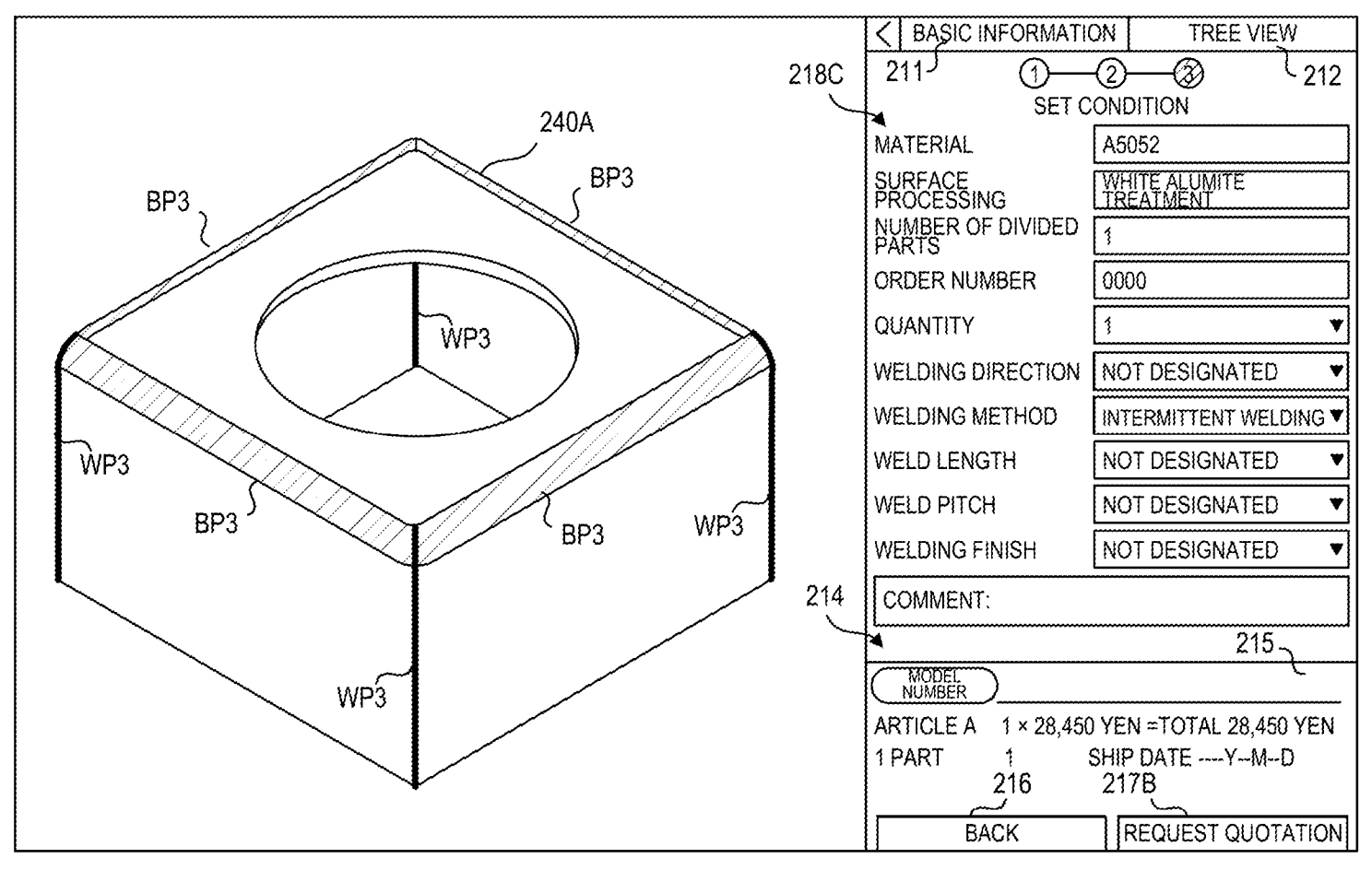

With reference to FIG. 15, confirmation of the welding portion of the article and quotation by the quotation part 22D will be described. When the user selects the forward button 217 on the pattern image screen or the welding portion specification screen, the provision part 22H causes the display device 46 to display the welding portion confirmation screen illustrated in FIG. 15. On the left side of FIG. 15, a first three-dimensional pattern image 240A is indicated as a three-dimensional image that is an example of the first machining pattern image created by the generation part 22G. The generation part 22G generates the first three-dimensional pattern image 240A based on the model data D1, the welding portion WP3 (including the third welding portion WP5 specified by the user designation) specified by the specification part 22B, and the bending portion BP3 specified by the specification part 22B. Incidentally, when the user selects the machining pattern image, the generation part 22G generates the first three-dimensional pattern image 240A based on the welding portion WP3 in the selected machining pattern image.

The first three-dimensional pattern image 240A is an imaginary diagram of a finished product. Therefore, the user can examine the quotation result while viewing the first three-dimensional pattern image 240A representing the finished product. The welding portions WP3 of the first three-dimensional pattern image 240A are indicated by a color (for example, green) different from other portions. Incidentally, in the example of FIG. 15, the welding portions WP3 indicated by green is indicated by thick lines. In FIG. 15, the bending portions BP3 are indicated by hatching. The first three-dimensional pattern image 240A is a three-dimensional model in which the observation direction can be changed by rotating the image. Alternatively, the first three-dimensional pattern image 240A may be a two-dimensional image.

When there is no bending portion, the generation part 22G generates the first three-dimensional pattern image 240A based on the model data D1 and the welding portion WP3 (including the third welding portion WP5 specified by the user designation) specified by the specification part 22B. Although not illustrated in FIG. 15, when the user clicks and designates a part of the first three-dimensional pattern image 240A, the designated part may be emphasized as compared with another part. The another part is a part separated from the part designated before welding. For example, the designated part is emphasized by being displayed in an aspect different from other parts. As an example, the different aspect is an aspect in which at least one of a color, a brightness, a line thickness, a line type and the like is different. In addition, the designated part may be displayed in an aspect different from the other parts by not displaying the other parts.

A quotation section is displayed on the right side of FIG. 15. The basic information tab 211 and the tree view tab 212 are included at the upper part of the quotation section. In the example of FIG. 15, a quotation condition section 218C displayed by selecting the basic information tab 211 is illustrated. The current step is displayed below the basic information tab 211 and the tree view tab 212. In the example of FIG. 15, the numbers of steps 1 to 3 are displayed, and step 3 which is the current step is indicated by hatching.

The quotation part 22D that creates the quotation information including the price of the article receives, from the user, the quotation condition for one of the first machining pattern image and the second machining pattern image selected by the user. Then, the quotation part 22D creates the quotation information based on the received quotation condition.

Specifically, a case where the user selects the first three-dimensional pattern image 240A which is the first machining pattern image will be described. In this case, the user can confirm a material of the article, a type of surface processing applied to the article, the number of divided parts to be welded, and an automatically generated order number in the quotation condition section 218C. Further, the user can select or change the quotation condition such as a welding direction, a welding method, and a welding finish. Then, the quotation part 22D receives, from the user, the quotation condition for the first three-dimensional pattern image 240A selected by the user. Subsequently, the quotation part 22D creates the quotation information including the price of the article based on the received quotation condition.

Examples of the welding method include intermittent welding, continuous welding, fiber laser welding, and the like. When the intermittent welding is selected, the user can further select a weld length and a weld pitch. When the continuous welding is selected, the provision part 22H causes the display device 46 to display a warning. As an example, the warning is a sentence "distortion due to heat may occur".

The welding finish is, for example, pickling, cutting processing, or the like to remove welding marks. When the welding finish is selected, the provision part 22H causes the display device 46 to display an image indicating an example of the welding finish and an explanatory sentence thereof. Incidentally, the quotation condition that can be selected or changed may be a machining condition of bending. For example, machining condition of the bending include a V bending method, an R bending method, a roll bending method, a Z bending method, and an air bending method. In addition, a comment input section is provided in the quotation condition section 218C. The user can input an arbitrary comment related to the machining or quotation of the article in the comment input section.

When the user inputs the quotation condition and selects a quotation button 217B, the quotation part 22D refers to the selected or changed quotation condition and performs the quotation processing of creating the quotation information including the corrected quoted price of the article. Then, the quotation part 22D causes the server memory 23 to store the quotation information. The total monetary amount as the corrected quoted price, the ship date. etc., are displayed in the quotation result section 214. For example, the quoted price is corrected to increase or decrease depending on the welding method and the welding finish.

The assistance system 100 according to the second embodiment described above can also provide a user with a plurality of machining pattern images indicating a welding portion corresponding to a plurality of mutually different priority conditions. Therefore, the user can compare the respective machining pattern images to set a machining condition (for example, a welding portion) of the article. Furthermore, according to the assistance system 100 according to the second embodiment, the user can select or designate the welding portion to be applied to the article to be quoted while viewing the plurality of machining pattern images.

[Second Modification]

Figure 16:
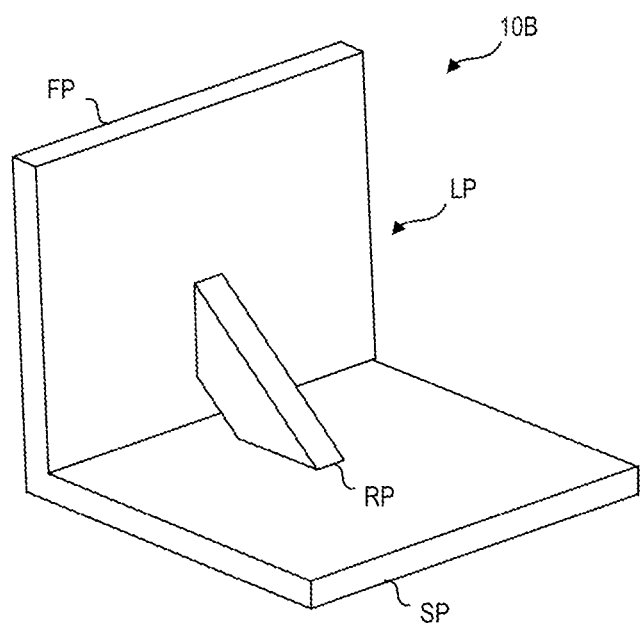
FIG. 16 is a schematic diagram illustrating an initial three-dimensional image according to a second modification.

The assistance system 100 is not limited to the case of using the model data D1 of the box-shaped article. For example, the assistance system 100 can also be applied to a case of using model data D1 of a ribbed article as illustrated in FIG. 16. Incidentally, FIG. 16 illustrates an initial three-dimensional image 10B of the article, and does not include a machining pattern image. The initial three-dimensional image 10A includes an L-shaped portion LP having a substantially L-shaped shape and a rib portion RP. The L-shaped portion LP includes a first portion FP and a second portion SP.

As an example, it is assumed that the first condition is a condition prioritizing the good appearance, and the second condition is a condition prioritizing a manufacturing price. In this case, according to the first condition, the first portion FP and the second portion SP, which are separate bodies, are welded to form the L-shaped portion LP. According to the second condition, a plate-shaped member is bent to form the first portion FP and the second portion SP of the L-shaped portion LP. Incidentally, the rib portion RP is welded to the formed L-shaped portion LP.

Hitherto, the present invention has been described with reference to the embodiments, but the present invention is not limited to the above embodiments. Inventions modified within a range without contradictory to the present invention and inventions equivalent to the present invention are also included in the present invention. In addition, each embodiment and each modification can be appropriately combined within a range without contradictory to the present invention.

For example, the system including the server 20 can be used for purposes other than setting of the machining condition. As an example, a system including the server 20 may be used for quotation of an article. In this case, the user can compare a plurality of machining pattern images indicating the welding portion according to a plurality of mutually different priority conditions to examine the quotation result.

Further, the assistance system 100 may include the client terminal 40. In this case, at least a part of each unit included in the server control part 22 may be provided in the terminal control part 45 of the client terminal 40. As an example, at least one of the data acquisition part 22A, the specification part 22B, the quotation part 22D, the generation part 22G, and the provision part 22H may be provided in the terminal control part 45. For example, the client terminal 40 receives the model data D1 input by the user and stores the model data D1 in the terminal memory 44. Then, the data acquisition part 22A of the terminal control part 45 acquires the model data D1 from the terminal memory 44. Further, the specification part 22B of the terminal control part 45 performs the specification processing based on the condition data D2 stored in the terminal memory 44.

Furthermore, the user may be able to change the shape or dimension of the article on the web page provided by the server control part 22. In this case, the server control part 22 reflects the change by the user in the model data D1 and causes the server memory 23 to store the model data D1. Then, the data acquisition part 22A acquires the model data D1 reflecting the change from the server memory 23. Further, the assistance system 100 may be configured to receive designation of a welding portion or a bending portion by a user. In this case, the generation part 22G generates the first and second machining pattern images indicating the welding portion designated by the user in addition to the first welding portion WP1 and the second welding portion WP2. Similarly, the generation part 22G generates the first and second machining pattern images indicating the bending portion designated by the user in addition to the first bending portion BP1 and the second bending portion BP2.

REFERENCE SIGNS LIST 22 server control part (computer)
22B specification part (specification unit)
22D quotation part (quotation unit)
22G generation part (pattern generation unit)
22H provision part (provision unit)
40 client terminal
60A first three-dimensional pattern image (first machining pattern image)
70A first two-dimensional pattern image (first machining pattern image)
80A second three-dimensional pattern image (second machining pattern image)
90A second two-dimensional pattern image (second machining pattern image)
100 assistance system
D1 model data
PG assistance program
BP1 first bending portion
BP2 second bending portion
WP1 first welding portion
WP2 second welding portion
WP5 third welding portion

The invention claimed is:

1. An assistance system that includes a processor, receives model data of an article from a client terminal and assists setting of a machining condition of the article, wherein the processor is configured to:
    automatically recognize boundaries between adjacent portions of the article;
    specify the boundaries as weldable portions where welding can be performed in the article based on the model data;
    specify a first welding portion of the article from the weldable portions according to a first condition among a plurality of priority conditions in manufacturing the article, and specify a second welding portion of the article from the weldable portions according to a second condition different from the first condition among the plurality of priority conditions;
    generate a first machining pattern image of the article in which the first welding portion is indicated and a second machining pattern image of the article in which the second welding portion is indicated;
    provide the client terminal with the first machining pattern image which includes the first welding portion that is visually distinguished from another portion of the first machining pattern image;
    provide the client terminal with the second machining pattern image which includes the second welding portion that is visually distinguished from another portion of the second machining pattern image;
    cause the first machining pattern image and the second machining pattern image to be displayed to provide the client terminal with the first machining pattern image and the second machining pattern image;
    cause selected one of the first machining pattern image and the second machining pattern image to be displayed larger than the other; and cause at least one web page to be displayed on a display part of the client terminal and execute ordering processes in response to an order placed by a user of the client terminal via the at least one web page.

2. The assistance system according to claim 1, wherein the processor further specifies a first bending portion of the article from the model data according to the first condition, or further specifies a second bending portion of the article from the model data according to the second condition, and
the processor generates the first machining pattern image in which the first welding portion and the first bending portion are indicated, or the second machining pattern image in which the second welding portion and the second bending portion are indicated.

3. The assistance system according to claim 1, wherein the plurality of priority conditions include at least two of a condition prioritizing a manufacturing price of the article, a condition prioritizing good appearance of the article, a condition prioritizing strength of the article, a condition prioritizing liquid tightness of the article, and a condition prioritizing airtightness of the article.

4. The assistance system according to claim 1, wherein the processor provides the client terminal with information indicating the first condition and information indicating the second condition together with the first machining pattern image and the second machining pattern image.

5. The assistance system according to claim 1, wherein the processor further specifies a third welding portion in accordance with designation by the client terminal, and
the processor generates the first machining pattern image in which the third welding portion is indicated.

6. The assistance system according to claim 1, wherein
the processor creates quotation information including a price of the article, and
the processor receives, from the client terminal, a quotation condition for one of the first machining pattern image and the second machining pattern image selected by the client terminal, and creates the quotation information based on the quotation condition.

7. The assistance system according to claim 1, wherein the ordering processes include arrangement of an ordered article, a delivery instruction, and billing of a purchase price.

8. The assistance system according to claim 1, wherein the processor is further configured to:
create pattern data having a topology structure, said topology structure having information on a connection relationship between portions of the article, an adjacency relationship between the portions, and plane recognition of each portion surrounded by lines; and
specify the boundaries based on the model data and the pattern data.

9. A non-transitory computer-readable storage medium storing an assistance program of an assistance system, the assistance system including a processor, receiving model data of an article from a client terminal, and assisting for setting of a machining condition of the article,
wherein the assistance program causing the processor to:
automatically recognize boundaries between adjacent portions of the article;
specify the boundaries as weldable portions where welding can be performed in the article based on the model data;
specify a first welding portion of the article from the weldable portions according to a first condition among a plurality of priority conditions in manufacturing the article, and specify a second welding portion of the article from the weldable portions according to a second condition different from the first condition among the plurality of priority conditions;
generate a first machining pattern image of the article in which the first welding portion is indicated and a second machining pattern image of the article in which the second welding portion is indicated;
provide the client terminal with the first machining pattern image which includes the first welding portion that is visually distinguished from another portion of the first machining pattern image;
provide the client terminal with the second machining pattern image which includes the second welding portion that is visually distinguished from another portion of the second machining pattern image;
cause the first machining pattern image and the second machining pattern image to be displayed to provide the client terminal with the first machining pattern image and the second machining pattern image;
cause selected one of the first machining pattern image and the second machining pattern image to be displayed larger than the other; and
cause at least one web page to be displayed on a display part of the client terminal and execute ordering processes in response to an order placed by a user of the client terminal via the at least one web page.

10. A control method of an assistance system that includes a processor, receives model data of an article from a client terminal and assists setting of a machining condition of the article, the control method comprising the steps of:
automatically recognizing boundaries between adjacent portions of the article;
specifying, by the processor, the boundaries as weldable portions where welding can be performed in the article based on the model data;
specifying, by the processor, a first welding portion of the article from the weldable portions according to a first condition among a plurality of priority conditions in manufacturing the article, and specifying, by the processor, a second welding portion of the article from the weldable portions according to a second condition different from the first condition among the plurality of priority conditions;
generating, by the processor, a first machining pattern image of the article in which the first welding portion is indicated and a second machining pattern image of the article in which the second welding portion is indicated;
providing, by the processor, the client terminal with the first machining pattern image which includes the first welding portion that is visually distinguished from another portion of the first machining pattern image;
providing, by the processor, the client terminal with the second machining pattern image which includes the second welding portion that is visually distinguished from another portion of the second machining pattern image;
causing the first machining pattern image and the second machining pattern image to be displayed to provide the client terminal with the first machining pattern image and the second machining pattern image;
causing selected one of the first machining pattern image and the second machining pattern image to be displayed larger than the other; and
causing at least one web page to be displayed on a display part of the client terminal and execute ordering processes in response to an order placed by a user of the client terminal via the at least one web page.

11. An assistance system that includes a processor, receives model data of an article from a client terminal and assists setting of a machining condition of the article, wherein the processor is configured to:
- automatically recognize boundaries between adjacent portions of the article;
- specify the boundaries as weldable portions where welding can be performed in the article based on the model data;
- specify a first welding portion of the article from the weldable portions according to a first condition among a plurality of priority conditions in manufacturing the article, and specify a second welding portion of the article from the weldable portions according to a second condition different from the first condition among the plurality of priority conditions;
- generate a first machining pattern image of the article in which the first welding portion is indicated and a second machining pattern image of the article in which the second welding portion is indicated;
- provide the client terminal with the first machining pattern image which includes the first welding portion that is visually distinguished from another portion of the first machining pattern image;
- provide the client terminal with the second machining pattern image which includes the second welding portion that is visually distinguished from another portion of the second machining pattern image;
- cause at least one web page to be displayed on a display part of the client terminal and execute ordering processes in response to an order placed by a user of the client terminal via the at least one web page;
- create quotation information including a first price of the article in a case of welding the first welding portion and a second price of the article in a case of welding the second welding portion; and
- provide the client terminal with information indicating the first price and information indicating the second price together with the first machining pattern image and the second machining pattern image.

* * * * *